(12) United States Patent
Ohta et al.

(10) Patent No.: US 9,118,479 B2
(45) Date of Patent: Aug. 25, 2015

(54) MOBILE COMMUNICATION SYSTEM

(75) Inventors: Yoshiaki Ohta, Yokohama (JP);
Yoshiharu Tajima, Yokohama (JP);
Yoshinori Tanaka, Yokohama (JP);
Yoshihiro Kawasaki, Yokosuka (JP);
Kazuhisa Obuchi, Yokohama (JP);
Katsumasa Sugiyama, Kawasaki (JP);
Masatsugu Shimizu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 367 days.

(21) Appl. No.: 13/618,413

(22) Filed: Sep. 14, 2012

(65) Prior Publication Data

US 2013/0012218 A1   Jan. 10, 2013

Related U.S. Application Data

(63) Continuation of application No. PCT/JP2010/054360, filed on Mar. 15, 2010.

(51) Int. Cl.
| | | |
|---|---|---|
| *H04W 72/00* | (2009.01) | |
| *H04L 1/18* | (2006.01) | |
| *H04W 72/12* | (2009.01) | |
| *H04L 1/00* | (2006.01) | |
| *H04W 84/04* | (2009.01) | |
| *H04W 88/08* | (2009.01) | |

(52) U.S. Cl.
CPC .............. *H04L 1/1887* (2013.01); *H04W 72/12* (2013.01); *H04L 2001/0097* (2013.01); *H04W 84/047* (2013.01); *H04W 88/08* (2013.01)

(58) Field of Classification Search
CPC ...................... H04L 1/1887; H04L 2001/0097; H04W 72/12; H04W 88/08; H04W 87/047

USPC .......... 455/450–452.2, 11.1, 7, 502; 370/315, 370/350, 328–329
See application file for complete search history.

(56) References Cited

U.S. PATENT DOCUMENTS

| | | | |
|---|---|---|---|
| 2008/0056173 A1 | 3/2008 | Watanabe | |
| 2008/0209301 A1* | 8/2008 | Chang et al. | 714/749 |

(Continued)

FOREIGN PATENT DOCUMENTS

| | | |
|---|---|---|
| JP | 2008-060951 | 3/2008 |
| JP | 2008-211803 | 9/2008 |

OTHER PUBLICATIONS

Translation of the International Preliminary Report on Patentability, with written opinion, issued for corresponding International Application No. PCT/JP2010/054360, mailed on Mar. 25, 2010.

(Continued)

*Primary Examiner* — Sharad Rampuria
(74) *Attorney, Agent, or Firm* — Myers Wolin, LLC

(57) ABSTRACT

A mobile communication system comprises a base station and a relay station to relay data transmitted/received between the base station and a mobile station. The base station includes a first scheduler to perform scheduling of initial transmission of the data transmitted/received between the base station and the mobile station via the relay station, and a first manager to manage predetermined wireless resources which are periodically used, as wireless resources used for the initial transmission of the data. The relay station includes a second scheduler configured to perform scheduling of transmission of a message for confirming necessity of retransmission of the data and retransmission of the data and a second manager configured to manage wireless resources used for the transmission of the message and the retransmission of the data.

12 Claims, 21 Drawing Sheets

(56) References Cited

U.S. PATENT DOCUMENTS

2009/0075587 A1* 3/2009 Yu et al. .............................. 455/7
2010/0302999 A1* 12/2010 Hui et al. ........................ 370/315
2011/0149774 A1* 6/2011 Chen et al. ..................... 370/252

OTHER PUBLICATIONS

Ericsson, ST Ericsson; "Un HARQ timing alternatives"; Agenda Item: 7.5.1.3; 3GPP TSG-RAN WG1 #60; Tdoc R1-100864; San Francisco, CA, USA; Feb. 22-26, 2010.

Samsung; "HARQ operation for relay"; Agenda Item: 7.4; 3GPP TSG RAN WG2 #67; R2-094878; Shenzhen, China; Aug. 24-28, 2009.

3GPP TR 36.913 V8.0.1 (Mar. 2009); 3rd Generation Partnership Project; Technical Specification Group Radio Access Network; "Requirements for further advancements for Evolved Universal Terrestrial Radio Access (E-UTRA) (LTE-Advanced) (Release 8)"; Mar. 2009.

International search report issued for corresponding International Patent Application No. PCT/JP2010/054360 mailed May 25, 2010.

* cited by examiner

FIG. 6
RadioResourceConfigDedicated information element

```
--ASN1START

RadioResourceConfigDedicated : : =    SEQUENCE {
    srb-ToAddModList           SRB-ToAddModList    OPTIONAL,    -- Cond HO-Conn
    drb-ToAddModList           DRB-ToAddModList    OPTIONAL,    -- Cond HO-
toEUTRA
    drb-ToReleaseList          DRB-ToReleaseList   OPTIONAL,    -- Need ON
    mac-Mainconfig             CHOICE {
        explicitValue              MAC-MainConfig,
        defaultValue               NULL
    }      OPTIONAL,
toEUTRA2
    sps-Config                 SPS-Config            OPTIONAL, -- Need ON
    physicalConfigDedicated    PhysicalConfigDedicated OPTIONAL, -- Need ON
    ...
}
SRB-ToAddModList : : =       SEQUENCE (SIZE (1..2)) OF SRB-ToAddMod
SRB-ToAddMod : : =           SEQUENCE {
    srb-Identity                   INTEGER (1..2),
    rlc-Config                     CHOICE {
        explicitValue                  RLC-Config,
        defaultValue                   NULL
    }      OPTIONAL,                                           -- Cond Setup
    logicalChannelConfig           CHOICE {
        explicitValue                  LogicalChannelConfig,
        defaultValue                   NULL
    }      OPTIONAL,                                           -- Cond Setup
    ***
}
DRB-ToAddModList : : =       SEQUENCE (SIZE (1..maxDRB)) OF DRB-ToAddMod DRB-ToAddMod  : : =          SEQUENCE {
    eps-BearerIdentity         INTEGER (0..15)     OPTIONAL,    -- Cond DRB-Setup
    drb-Identity               DRB-Identity,
    pdcp-Config                PDCP-Config         OPTIONAL,    -- Cond PDCP
    rlc-Config                 RLC-Config          OPTIONAL,    -- Cond Setup
    logicalChannelIdentity     INTEGER (3..10)     OPTIONAL,    -- Cond DRB-Setup
    logicalChannelConfig       LogicalChannelConfig OPTIONAL,   --Cond SetUP
    ...
}
DRB-ToReleaseList : : =      SEQUENCE (SIZE (1..maxDRB)) OF  DRB-Identity

--ASN1STOP
```

FIG. 7
SPS-Config information element

```
---ASN1START

SPS-Config ::=        SEQUENCE {
    semiPersistDSchedC-RNTI    C-RNTI          OPTIONAL,    -- Need OR
    sps-ConfigDL               SPS-ConfigDL    OPTIONAL,    -- Need ON
    sps-ConfigUL               SPS-ConfigUL    OPTIONAL     -- Need ON
}
SPS-ConfigDL ::=   CHOICE {
    release                    NULL,
    setup                      SEQUENCE {
        semiPersistSchedIntervalDL     ENUMERATED {
                                           sf10, sf20, sf32, sf40, sf64, sf80,
                                           sf128, sf160, sf320, sf640, spare6,
                                           spare5, spare4, spare3, spare2,
                                           spare1},
        numberOfConfSPS-Processes      INTEGER (1..8),
        n1-PUCCH-AN-PersistentList     N1-PUCCH-AN-PersistentList,
        ...
    }
}
SPS-ConfigUL ::=    CHOICE {
    release                    NULL,
    setup                      SEQUENCE {
        semiPersistSchedIntervalUL     ENUMERATED {
                                           sf10, sf20, sf32, sf40, sf64, sf80,
                                           sf128, sf160, sf320, sf640, spare6,
                                           spare5, spare4, spare3, spare2,
                                           spare1},
        implicitReleaseAfter           ENUMERATED {e2, e3, e4, e8},
        p0-Persistent                  SEQUENCE {
            p0-Nominal PUSCH-Persistent    INTEGER (-126..24)
            p0-UE-PUSCH-Persistent         INTEGER (-0..7)
        }    OPTIONAL,                                              --Need OP
        twoIntervalsConfig             ENUMERATED {true}   OPTIONAL, --Cond TDD
        ...
    }
}
N1- PUCCH-AN-PersistentList ::=   SEQUENCE (SIZE (1..4)) OF INTEGER (0.. 2047)
-- ASN1STOP
```

MOBILE COMMUNICATION SYSTEM

CROSS-REFERENCE TO RELATED APPLICATION

This application is based upon and claims the benefit of priority of the International Patent Application No. PCT/JP2010/054360, filed on Mar. 15, 2010, the contents of which are herein wholly incorporated by reference.

FIELD

The disclosure relates to a mobile communication system.

BACKGROUND

Cellular-type mobile communication has evolved from UMTS (Universal Mobile Telecommunication System) to LTE (Long Term Evolution). In LTE, an OFDM (Orthogonal Frequency Division Multiplexing) based system is provided as a wireless access technique. According to LTE, high-speed wireless packet communication with a downlink peak transmission rate of 100 Mbps or more and an uplink peak transmission rate of 50 Mbps or more becomes possible.

Currently, the 3GPP (3rd Generation Partnership Project), an international standardization body, has started examination of LTE-A (LTE-Advanced), an LTE-based mobile communication system, for realization of higher-speed communication. LTE-A aims at a downlink peak transmission rate of 1 Gbps and an uplink peak transmission rate of 500 Mbps, and various new techniques, such as wireless access methods and network architectures, are examined (for example, Non-Patent document 1). On the other hand, LTE-A is required to be compatible with LTE because it is an LTE-based system.

As one of methods for performing high-speed data communication, a method of introducing a relay station to support communication between a base station and a mobile station is examined. The relay station intervenes between a conventional base station and mobile station, and it is installed to support high-speed data communication. As the relay station, for example, a relay station which only amplifies a wireless signal (a data signal and noise) (a repeater system), a relay station capable of amplifying only a data signal in a wireless signal (a decode-and-forward system), a relay station implemented with functions of Layer 2 (L2: (such as a MAC (Media Access Control) layer or the like) (an L2 relay station), and a relay station implemented with functions of Layer 3 (L3 (an RRC (Radio Resource Control) layer)) and behaving as a station having functions equivalent to those of a base station (L3 system) are examined.

A method of developing relay stations in a cell is also examined. For example, a method of developing relay stations at cell ends for the purpose of increasing the throughput at the cell ends or a method of developing relay stations within a range where radio waves do not reach (blind zones) are examined.

[Non-Patent document 1] 3GPP TR 36.913, "Requirements for further advancements for Evolved UniversaLTErrestrial Radio Access (E-UTRA) (LTE-Advanced)", V8.0.1, Release 8, May 2009.

In data communication via a relay station, the relay station is involved in conventional data communication between a base station and a mobile station. As matters to be examined for scheduling of data transmission in consideration of a relay station, a wireless resource management method and an HARQ (Hybrid Automatic Repeat Request) control method are given. Here, HARQ is a data retransmission system in which a retransmission pattern is determined in consideration of the point that, on the receiving side, such data that decoding has failed may be combined with retransmitted data without being discarded.

From a viewpoint of a scheduling execution place, scheduling is roughly classified into two systems: centralized scheduling and distributed scheduling. In the centralized scheduling, a base station which controls a relay station executes scheduling of data transmission related to relay stations under the base station and mobile stations under the relay stations. On the other hand, in the distributed scheduling, a base station which controls relay stations executes only scheduling of data transmission related to mobile stations connected to the base station itself, and the relay stations execute only scheduling of data transmission related to mobile stations related to the relay stations themselves.

As for the wireless resource management method, in LTE, management of wireless resources is controlled by the RRC layer of a base station. In comparison, in LTE-A, a relay station is also involved in communication. Therefore, a wireless resource management place and method are examined. In LTE-A, one or more L3-system relay stations having functions equivalent to those of a base station may be installed in the cell of a base station. Here, the base station controlling the relay stations are called a donor base station (Donor eNB). The donor base station and the relay stations may communicate between the RRC layers. Therefore, by performing wireless resource management in cooperation between the RRC layers, it is possible to perform efficient wireless resource management.

As the method for wireless resource management by scheduling, there are dynamic scheduling and semi-persistent scheduling (SPS). The dynamic scheduling is used for non-real-time type communication such as communication for web browsing. In the dynamic scheduling, wireless resources used for a PDCCH (Physical Downlink Control Channel) are specified in both of uplink communication and downlink communication. In comparison, the semi-persistent scheduling (SPS) is used for real-time type communication represented by VoIP (Voice over IP). In the SPS, wireless resources are fixedly allocated for a certain predetermined period, before communication is actually executed. For example, in VoIP communication, initial transmission of data occurs every 20 ms. Therefore, wireless resources to be used are notified every 20 ms. However, when retransmission of data is executed, the dynamic scheduling is used.

As the HARQ control method, there is a control system described below. In LTE, an asynchronous HARQ system is adopted for downlink communication, and a synchronous HARQ system is adopted for uplink communication.

In LTE-A, it is required to support the above asynchronous HARQ system and synchronous HARQ system for at least LTE mobile stations in order to secure compatibility with LTE.

The asynchronous HARQ system is a method of receiving a confirmation response (ACK or NACK) to downlink transmission after 4 ms and, when the confirmation response is NACK, executing downlink retransmission at an arbitrary timing. In the asynchronous HARQ system, a base station is required to notify a mobile station of data transmission, necessarily using a PDCCH. On the other hand, the asynchronous HARQ system is a method of receiving a confirmation response to uplink transmission after 4 ms and, when the confirmation response is NACK, executing uplink retransmission 4 ms after the reception. In the asynchronous HARQ system, the base station is not required to notify a mobile station of data transmission by a PDCCH. In other words, a mobile station may retransmit data without receiving notification by the PDCCH. As described above, in the asynchronous HARQ system, it is possible to retransmit data without a PDCCH and, therefore, reduce signaling overhead.

When a relay station is involved in data communication between a base station and a mobile station in LTE-A, data processing time at the relay station occurs. Therefore, development of a method for maintaining the timing provided for the synchronous HARQ system or the asynchronous HARQ system as described above has been desired. That is, there may be a case that compatibility with the synchronous HARQ system or asynchronous HARQ system provided in LTE cannot be maintained due to intervention of a relay station between a mobile station and the base station.

FIG. 20 is a diagram illustrating an example of HARQ timing in uplink communication. FIG. 20 illustrates an example of a case that data is transmitted from a mobile station (UE: User Equipment) to a donor base station (DeNB) via a relay station (RN: Relay Node).

In the example illustrated in FIG. 20, wireless resources (a transmission timing) used for data transmission by the mobile station (UE) and the relay station (RN) are determined in advance by the SPS. In the example illustrated in FIG. 20, the UE transmits data (data 1) to the relay station at a timing in accordance with the SPS, that is, at a sub-frame number "0" (1 sub-frame: 1 ms) between the mobile station and the relay station.

The relay station relays the data 1 from the mobile station to the donor base station at a timing in accordance with the SPS, that is, at a sub-frame number "8" between the relay station and the donor base station. The donor base station returns a confirmation response (ACK or NACK) to the relay station at a sub-frame number "12" 4 ms after the sub-frame number "8" in accordance with the synchronous HARQ system. At this time, when failing in decoding (normal reception) of the data 1, the donor base station returns a NACK (HARQ NACK) message indicating the failure, to the relay station at the sub-frame number "12" in accordance with the synchronous HARQ system.

The relay station transfers the HARQ NACK message to the mobile station at a sub-frame number "12" between the mobile station and the relay station corresponding to 4 ms after the sub-frame number "12" in accordance with the synchronous HARQ system. Therefore, the mobile station receives the HARQ NACK message to the data 1 at the sub-frame number "12." Then, the mobile station retransmits the data 1 at a sub-frame number "16" after 4 ms in accordance with the synchronous HARQ system.

According to the synchronous HARQ system in LTE, however, the HARQ NACK message (HARQ feedback) from the donor base station should be received at a sub-frame number "4" 4 ms after the sub-frame number "0." The retransmission of the data 1 from the mobile station should be performed at a sub-frame number "8" after elapse of 4 ms after the sub-frame number "4." As described above, there is a problem that, when the relay station intervenes, an operation which is not compatible with the synchronous HARQ system of LTE occurs.

FIG. 21 is a diagram illustrating an example of HARQ timing in downlink communication. FIG. 21 illustrates an example of a case that data is transmitted from a donor base station (DeNB) to a mobile station (UE: User Equipment) via a relay station (RN: Relay Node). In the example illustrated in FIG. 21, the donor base station transmits data to a mobile station every ten sub-frames in accordance with the SPS. For example, data (data 1) from the donor base station is transmitted to the relay station at a sub-frame number "0" between the relay station and the base station. The relay station transfers the data 1 to the mobile station at a sub-frame number "4" (a sub-frame number "0" between the mobile station and the relay station) after elapse of 4 ms.

The mobile station returns a confirmation response (ACK or NACK) to the relay station at a sub-frame number "4" 4 ms after the sub-frame number "0" in accordance with the asynchronous HARQ system. In this case, when decoding (normal reception) of the data 1 fails, a NACK (HARQ NACK) message is returned.

The relay station returns a NACK message to the donor station at a sub-frame number "12" (between the relay station and the donor station) after elapse of 4 ms in accordance with the asynchronous HARQ system. The donor base station retransmits the data 1 to the relay station at an arbitrary timing, for example, at a sub-frame number "16" as illustrated in FIG. 21 in accordance with the asynchronous HARQ system. The relay station relays the retransmission of the data 1 to the mobile station after elapse of 4 ms.

As described above, when the relay station intervenes, the donor station cannot receive a confirmation response at a timing in accordance with the asynchronous HARQ system (the original reception timing is the sub-frame number "4") even in downlink communication.

SUMMARY

An embodiment of the present invention is a mobile communication system, comprising: a base station; and a relay station to relay data transmitted/received between the base station and a mobile station.

The base station includes: a first scheduler configured to perform scheduling of initial transmission of the data transmitted/received between the base station and the mobile station via the relay station; and a first manager configured to manage predetermined wireless resources which are periodically used, as wireless resources used for the initial transmission of the data.

The relay station includes: a second scheduler configured to perform scheduling of transmission of a message for confirming necessity of retransmission of the data and retransmission of the data; and a second manager configured to manage wireless resources used for the transmission of the message and the retransmission of the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6 illustrates a format example of a Radio Resource Config Dedicated message;

FIG. 7 illustrates a format example of sps-Configuration;

DESCRIPTION OF THE EMBODIMENT

An embodiment of the present invention will be described below with reference to drawings. The configuration in the embodiment is illustrated as an example, and the present invention is not limited to the configuration of the embodiment.

<Mobile Communication System>

Figure 1:
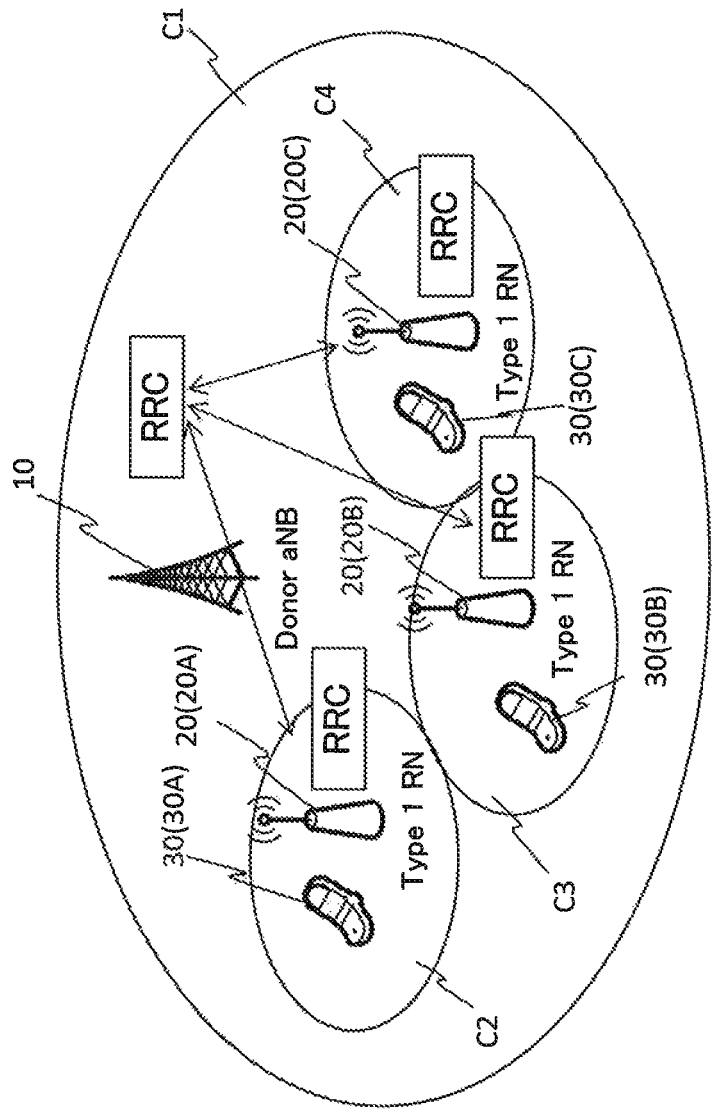
FIG. 1 illustrates a configuration example of a mobile communication system according to an embodiment of the present invention.

FIG. 1 illustrates a configuration example of a mobile communication system according to the embodiment of the present invention. In FIG. 1, the mobile communication system is provided with a donor station (DeNB) 10 (hereinafter referred to simply as "base station 10") and one or more relay stations (RNs) 20 controlled by the base station 10. Though three relay stations 20A, 20B and 20C (hereinafter referred to as "relay station (s) 20" when the relay stations 20A to 20C are not distinguished from one another) are illustrated in the example illustrated in FIG. 1, any number of relay stations 20 may be installed.

The relay stations 20 are installed at appropriate positions in a communication range (cell) C1 of the base station 10. The relay stations 20A, 20B and 20C have communication areas (cells) C2, C3 and C4, respectively, and each of them may communicate with a mobile station (UE) 30 existing in its cell to relay communication between the mobile station 30 and the base station 10. In the example illustrated in FIG. 1, a mobile station 30A existing in the cell C2 of the relay stations 20A, a mobile station 30B existing in the cell C3 of the relay stations 20B, and a mobile station 30C existing in the cell C4 of the relay stations 20C are illustrated. Hereinafter, the mobile stations 30A to 30C are referred to as "mobile station(s) 30" when they are not distinguished from one another. The mobile stations 30 support LTE.

The relay stations 20 are relay stations implemented with L3 (RRC (Radio Resource Control) protocol) functions (L3 relay stations). The cells (C2 to C4) of such relay stations 20 appear to be cells independent from the cell C1 of the base station 10 when seen from the mobile stations 30. Therefore, when seen from the mobile station 30 supporting LTE, the relay station 20 appears to be one base station.

Figure 2:
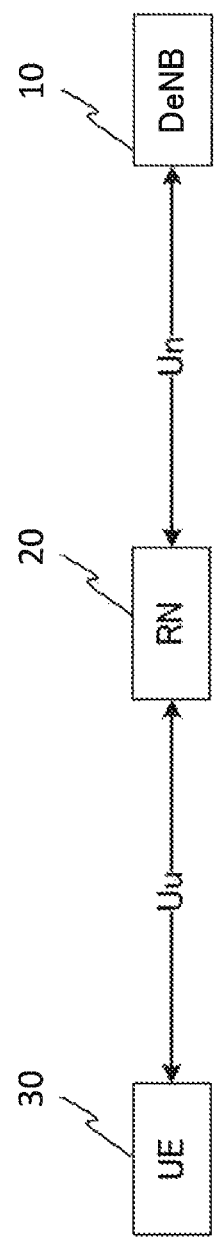
FIG. 2 is an explanatory diagram of an interface between a base station and a relay station (Un interface) and an interface between the relay station and a mobile station (Uu interface)

That is, in the embodiment, the base station 10 and the relay stations 20 are connected via a network-side Un interface, and the relay stations 20 and the mobile station 30 are connected via a user-side Uu interface, as illustrated in FIG. 2.

In this embodiment, scheduling of initial transmission of data (a transmission/reception timing of initially transmitted data) and wireless resources for the Un interface (between the base station and the relay station) involved in the initial transmission are managed by the base station 10. The relay station 20 allocates wireless resources for the Uu interface (between the relation station and the mobile station) to the mobile station 30 in accordance with the initial transmission scheduling managed by the base station 10. Furthermore, the relay station 20 manages scheduling of retransmission of data (transmission/reception timings of a confirmation response message and the retransmitted data) and wireless resources for the data retransmission.

<Uplink Communication>

In distribute scheduling in which the base station 10 is not involved in scheduling of data transmission/reception, the efficiency deteriorates when SPS (Semi-persistent Scheduling) is performed. In the SPS, allocated wireless resources are continuously used for a certain medium- or long-term predetermined period. In this case, there is a possibility that, depending on the communication position of the mobile station 30, interference occurs between the base station 10 and the relay station 20, and the interference continues for a certain medium-term period or long-term period.

For example, it may occur that, as a result of scheduling of wireless resources to the mobile stations 30 is performed independently by the base station 10 and the relay stations 20, the same wireless resources (frequency and a time axis) are allocated to each of a mobile station 30 connected to the relay stations 20 and a mobile station 30 connected to the base station 10, and each of the mobile stations 30 executes uplink transmission. In this case, radio waves emitted from the mobile stations 30 become mutual interference waves. When the wireless resources used by each mobile station 30 are allocated by the SPS, each mobile station continues to use the wireless resources for a medium- or long-term period, and medium- or long-term interference continues. Consequently, there is a possibility that the communication efficiency of each mobile station 30 deteriorates.

Therefore, in this embodiment, when the SPS is executed, wireless resources used for initial transmission of data in accordance with the SPS are managed by the base station 10, and wireless resources used for retransmission of the data in accordance with the SPS are managed by the relay stations 20.

Figure 3:
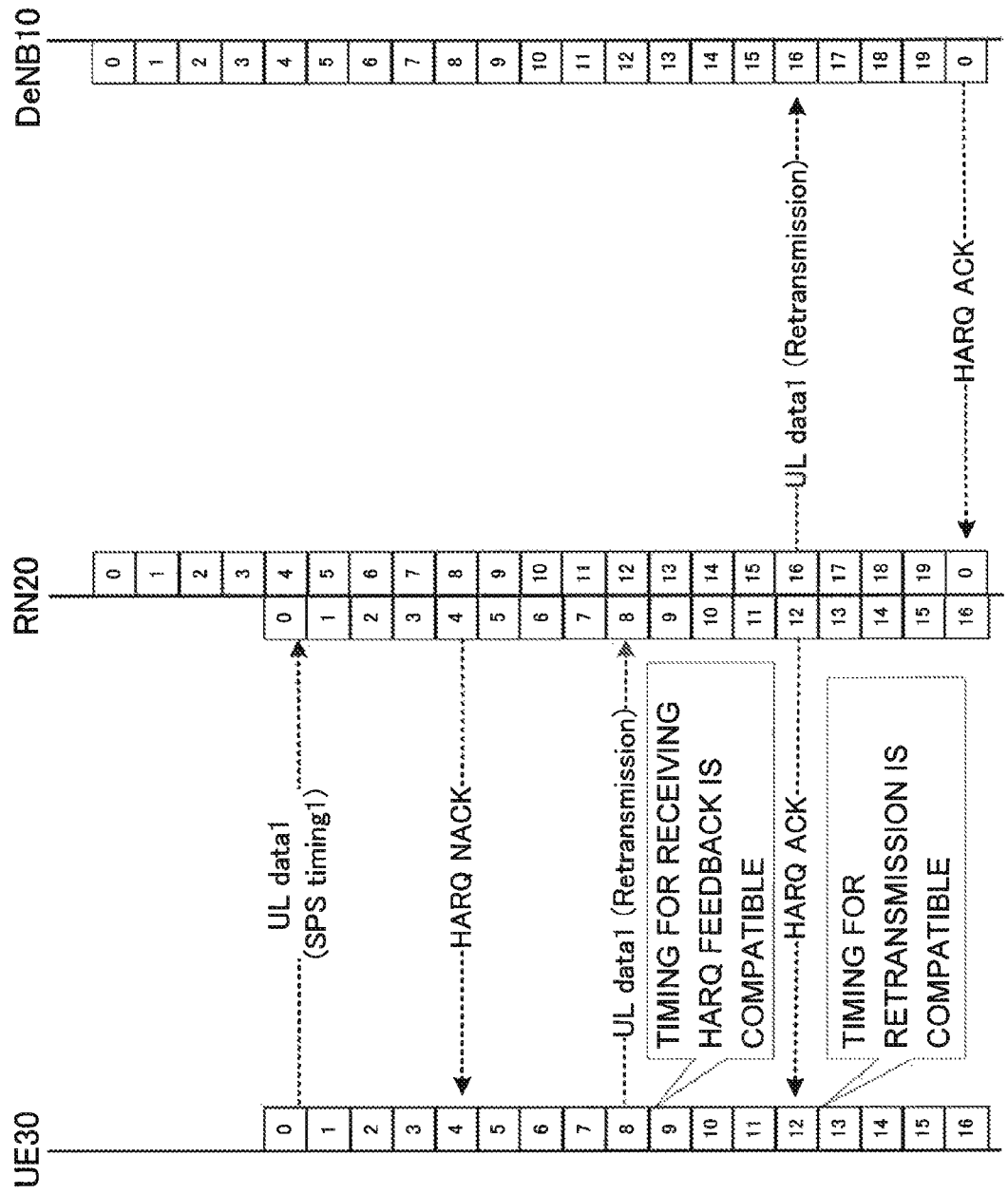
FIG. 3 is a diagram illustrating an example of HARQ timing in uplink communication in the embodiment.

FIG. 3 is a diagram illustrating an example of HARQ timing in uplink communication in this embodiment. FIG. 3 illustrates an example of a case that data is transmitted from the mobile station (UE) 30 to the base station (DeNB) 10 via the relay station (RN) 20.

In the example illustrated in FIG. 3, wireless resources managed by the base station 10, which are used for initial transmission of data to be transmitted from the mobile station 30 to the base station 10 via the relay station 20, are allocated to the relay station 20 and the mobile station 30 in accordance with the SPS performed by the base station 10. On the other hand, scheduling of retransmission of the data is performed by the relay station 20, and wireless resources used in accordance with a result of the scheduling by the relay station 20 are managed by the relay station 20 and allocated to the mobile station 30 and the base station 10.

Therefore, initially transmitted data which is transmitted from the mobile station 30 to the base station 10 is transmitted and received with the use of a result of SPS scheduling by the base station 10 and wireless resources allocated in accordance with the scheduling result.

In the example illustrated in FIG. 3, the mobile station 30 transmits data (data 1) to the relay station 20 at a timing in accordance with the SPS, that is, at a sub-frame number (a transmission timing) "0" (1 sub-frame: 1 ms) in the Uu interface between the mobile station and the relay station.

The relay station 20 returns a confirmation response message (ACK or NACK) at a sub-frame number "4" so that the mobile station 30 may receive the confirmation response message after elapse of 4 ms in accordance with the synchronous HARQ system applied to uplink communication in LTE. In this case, when failing in decoding (normal reception) of the data 1, the relay station 20 returns an HARQ NACK message to the mobile station 30.

The mobile station 30 receiving the HARQ NACK message at the sub-frame number "4" retransmits the data 1 to the relay station 20 at a sub-frame number "8" after elapse of 4 ms after the sub-frame number "4" in accordance with scheduling and wireless resource allocation performed by the relay stations 20 in accordance with the synchronous HARQ system.

When succeeding in decoding (normal reception) of the data 1, the relay station 20 returns a confirmation response, a HARQ ACK message indicating the success to the mobile station 30 at a sub-frame number "12" after elapse of 4 ms in accordance with the synchronous HARQ system. On the other hand, the relay station 20 transmits the retransmitted data 1 to the base station 10 at a sub-frame number (a transmission timing) "16" of the Un interface corresponding to the sub-frame number "12" of the Uu interface. The base station 10 returns a confirmation response message (in FIG. 3, HARQ ACK) to the relay station 20 at a sub-frame number "0" after 4 ms in accordance with the synchronous HARQ system.

As described above, according to the embodiment, since scheduling and wireless resources for initial transmission of data are managed by the base station 10, the base station 10 may determine a transmission timing and wireless resource allocation for each of the mobile stations 30 in a manner that the multiple different mobile stations 30 do not use the same wireless resources (frequency and a time axis) at the same time. By such allocation of wireless resources for initial transmission being performed by the base station 10 being performed for each mobile station 30, it is possible to avoid the mobile stations 30 using the same wireless resources at the same time. Thus, it is possible to prevent occurrence of interference for a medium- or long-term period because of the multiple mobile stations 30 using the same wireless resources for a medium- or long-term period by setting of the SPS as described above, and avoid deterioration of communication efficiency.

Furthermore, according to this embodiment, scheduling and wireless resources for retransmission of data are managed by the relay stations 20. Thereby, it is possible to transmit a confirmation response message transmitted for retransmission of data and the data to be retransmitted at a desired timing. Thereby, even if the relay stations 20 intervenes between the base station 10 and the mobile station 30, it is possible to cause a retransmission procedure in accordance with the synchronous HARQ system supported by LTE to be performed for the mobile station 30 (an LTE terminal). That is, it is possible to maintain compatibility (backward compatibility) with the mobile station 30 which is an LTE terminal.

Furthermore, the wireless resources for retransmission which the relay station 20 allocates to the mobile station 30 may be determined in consideration of the communication environment of the cell of the relay station 20. Thereby, even if the relay station 20 intervenes between the base station 10 and the mobile station 30, it is possible to cause appropriate data retransmission to be executed.

<Downlink Communication>

In the case of downlink communication also, the method applied to uplink communication is applied. That is, the base station 10 performs scheduling (for example, the SPS) for initial transmission of data as well as management of wireless resources for initial transmission. On the other hand, scheduling for retransmission of data is performed by the relay station 20, and wireless resources used for retransmission of data are managed by the relay station 20.

Figure 4:
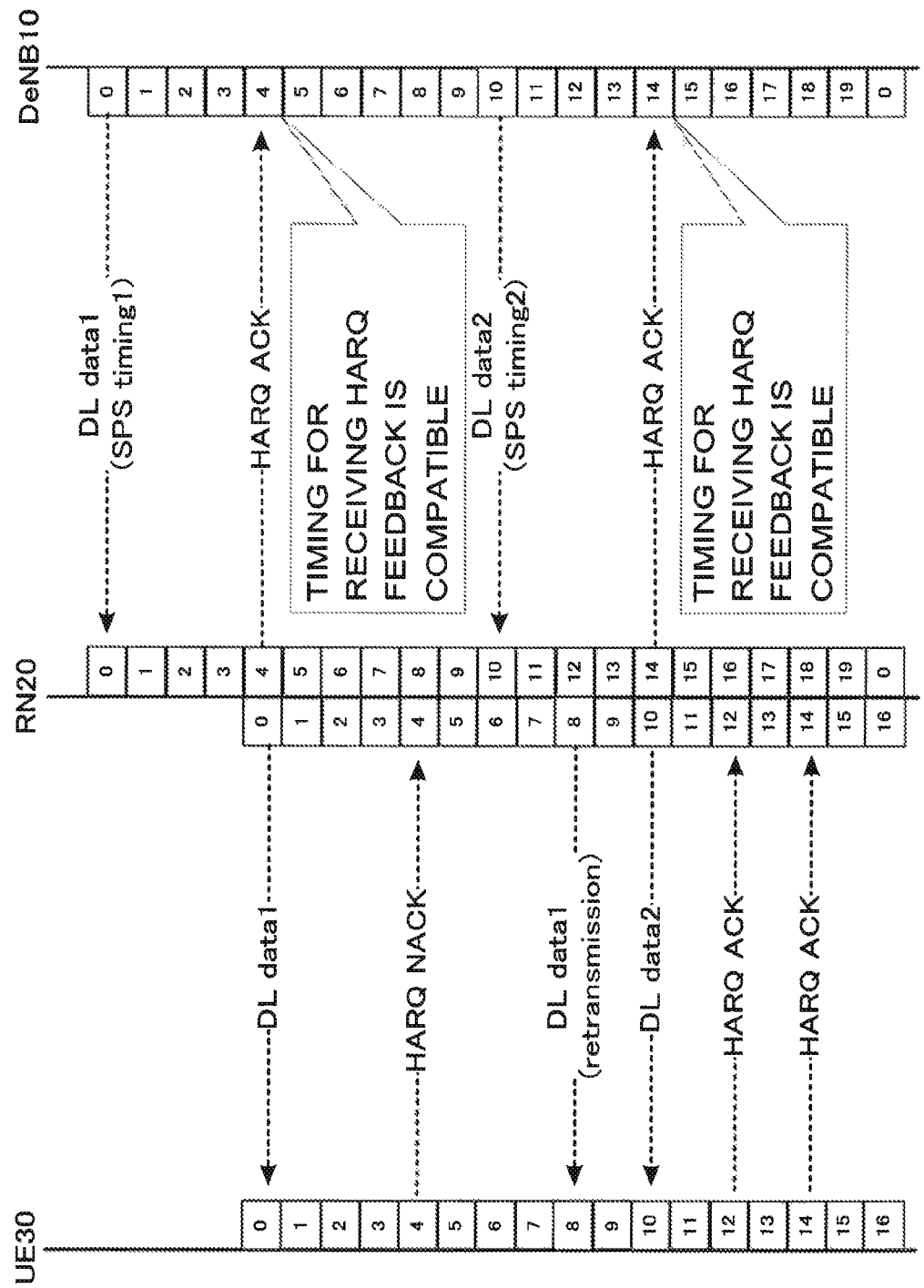
FIG. 4 is a diagram illustrating an example of HARQ timing in downlink communication in the embodiment.

FIG. 4 is a diagram illustrating an example of HARQ timing in downlink communication in the embodiment. FIG. 4 illustrates an example of a case that data is transmitted from the base station (DeNB) 10 to the mobile station (UE) 30 via the relay station (RN) 20.

In the example illustrated in FIG. 4, the base station 10 transmits data to the mobile station 30 every ten sub-frames in accordance with the SPS. The base station 10 transmits data (data 1) to the relay station 20 by a wireless resource for initial transmission allocated by the base station 10, that is, at a sub-frame number "0" between the relay station and the base station (the Un interface). The relay station 20 transfers the data 1 to the mobile station 30 at a sub-frame number "4" (a sub-frame number "0" between the mobile station and the relay station) after elapse of 4 ms.

The mobile station 30 returns a confirmation response (ACK or NACK) to the relay station 20 at a transmission timing in accordance with the asynchronous HARQ system, that is, at a sub-frame number "4" 4 ms after the sub-frame number "0" in accordance with scheduling performed by the relay station 20.

Thus, the mobile station 30 returns a confirmation response message to the relay station 20 at the sub-frame number "4" after elapse of 4 ms in accordance with the asynchronous HARQ system. In the example illustrated in FIG. 4, a NACK message indicating failure in reception is returned to the relay station 20.

Then, the relay station 20 retransmits the data 1 to the mobile station 30 at an arbitrary timing, at a sub-frame number "8" in the example in FIG. 4, in accordance with the asynchronous HARQ system. The base station 10 transmits the next data (data 2) to the relay station 20 at a sub-frame number "10." The relay station 20 transmits a confirmation response message (HARQ ACK) after 4 ms as well as transmitting the data 2 to the mobile station 30, in accordance with the asynchronous HARQ system.

The mobile station 30 transmits a confirmation response message (ACK) to the retransmitted data 1 at a sub-frame number "12" and transmits a confirmation response message (ACK) to the data 2 at a sub-frame number "14," in accordance with the asynchronous HARQ system.

According to the above operation, by wireless resources for initial transmission being managed by the base station 10, it is possible to avoid medium- or long-term interference due to simultaneous use of the same wireless resources by the base station 10 and the relay station 20, similarly to the case of uplink communication. On the other hand, by wireless resources for retransmission being managed by the relay station 20, it is possible to maintain backward compatibility with regard to HARQ timing. That is, it is possible to return an HARQ feedback (a confirmation response message) in accordance with the asynchronous HARQ system to the base station 10.

Furthermore, it is possible to allocate the wireless resources for retransmission in consideration of the communication environment of the cell under the relay station 20.

As illustrated in FIG. 4, when retransmission of the data 1 from the relay station 20 to the mobile station 30 is successful, HARQ ACK indicating the success in the retransmission is returned from the mobile station 30 to the relay station 20. However, even if receiving HARQ ACK, the relay station 20 does not relay HARQ ACK to the base station 10. Thereby, it is possible to prevent the base station 10 from receiving an HARQ feedback (a confirmation response message) at an unexpected timing.

Furthermore, as illustrated in FIG. 4, when receiving the confirmation response message (HARQ ACK) indicating success in reception of the data 1, the base station 10 transmits the next data 2 on the assumption that the transmission of the data 1 to the mobile station 30 is successful, irrespective of whether or not data retransmission has occurred between the relay station 20 and the mobile station 30. By an appropriate retransmission procedure being performed between the mobile station 30 and the relay station 20 in this way in the manner described above, it is possible for the mobile station 30 to receive the data 1 and for the base station 10 to receive the confirmation response message at a timing determined in advance.

<Method for Setting Cooperation Control>

In the description above, HARQ retransmission control based on cooperation control for wireless resource allocation between the base station 10 and the relay station 20 in each of the cases of uplink communication and down link communication has been explained. Next, a method for realizing the cooperation control will be described.

In this embodiment, a method for the base station 10 setting wireless resources for the Uu interface at the time of setup of the relay station 20 will be illustrated.

Figure 5:
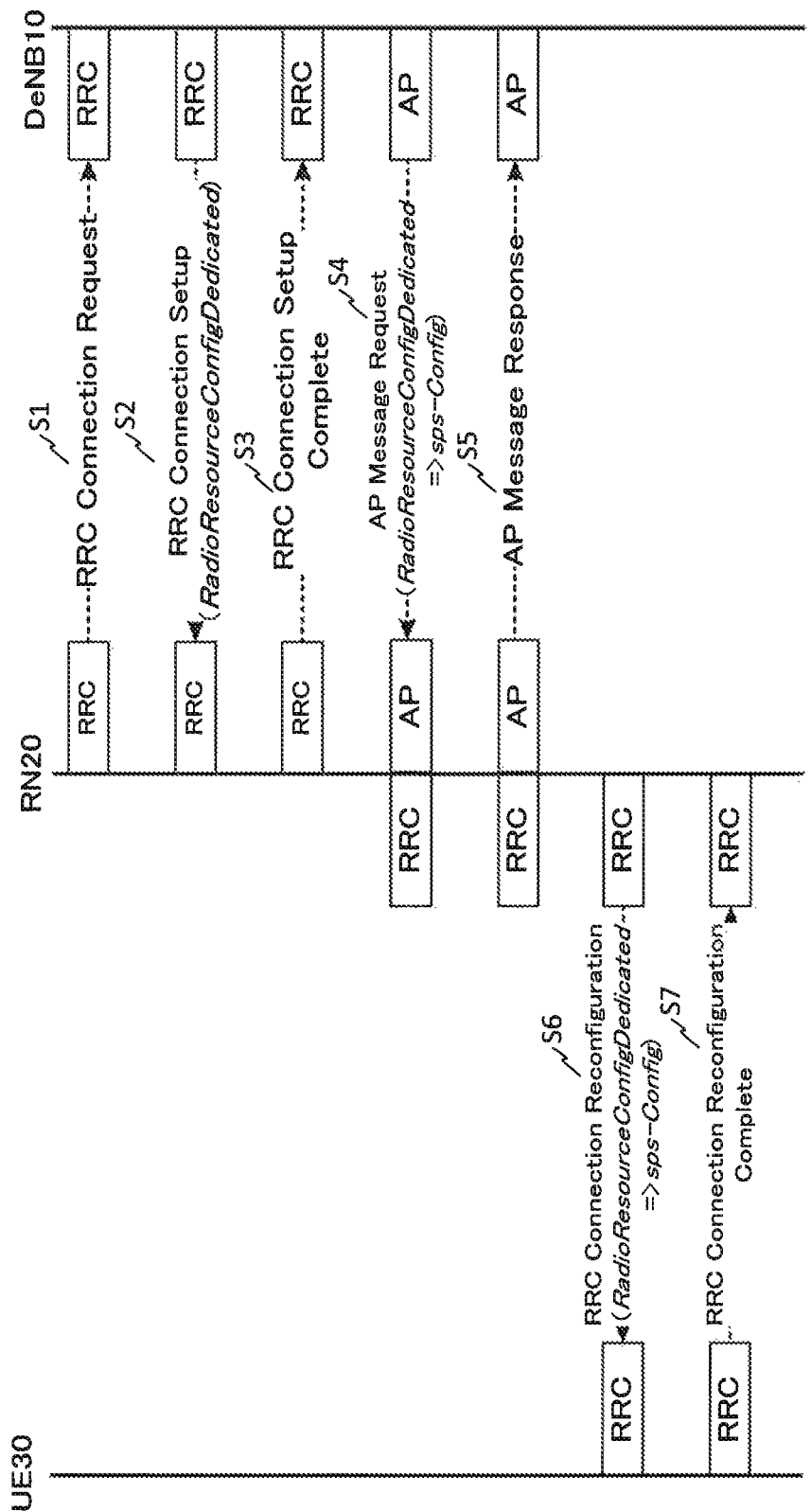
FIG. 5 is a diagram illustrating an example of a procedure for setting of wireless resources for the Uu interface by a base station 10 in the embodiment.

FIG. 5 is a diagram illustrating an example of a procedure for setting of wireless resources for the Uu interface by the base station 10 in the embodiment. In FIG. 5, the base station 10 and the relay stations 20 are implemented with an application part (AP). As the AP, for example, X1AP provided in LTE may be illustrated as an example. The AP is not limited to X1AP, and it is possible to provide a new AP in accordance with LTE-A. In short, any protocol is possible if the protocol is the top layer (application) which performs various controls of a wireless link between the base station 10 and the relay station 20.

In the procedure in FIG. 5, the relay station 20 sends RRC Connection Request to the base station 10 at the RRC layer first (S1). The base station 10 returns RRC Connection Setup to the relay station 20 (S2). Then, the relay station 20 returns RRC Connection Setup Complete to the base station 10 (S3). The above communications of steps S1 to S3 are a procedure for setting up the relay station 20.

Next, the base station 10 transmits an AP message request (a request to allocate wireless resources), which is a message at the AP layer, to the relay stations 20 (S4) and performs setting of Uu RRC (wireless resources for the Uu interface). That is, the base station 10 specifies allocation of wireless resources (SPS resources) to be used by the relay stations 20 which has been set up, for initial transmission of data for a medium- or long-term period, and notifies the relay station 20 of information about the wireless resources.

For example, the base station 10 may use a Radio Resource Configuration Dedicated message (FIG. 6) provided in LTE to perform setting of wireless resources related to the SPS for the relay stations 20 using control information called sps-Config (FIG. 7) included in the Radio Resource Configuration Dedicated message. However, a message different from the Radio Resource Configuration Dedicated message may be applied to setting of the wireless resources. When receiving the Radio Resource Configuration Dedicated message, the relay station performs SPS setting of wireless resources for the Un interface in accordance with the contents provided in sps-Config, and returns a response message (an AP message response) when the setting is completed (S5).

After that, when the mobile station 30 connects to the relay station 20, the relay station 20 allocates wireless resources for initial transmission allocated by the base station 10 to the mobile station 30 using an RRC Connection Reconfiguration message (an allocation request message) (S6). The RRC Connection Reconfiguration message includes the above-described Radio Resource Configuration Dedicated message which includes sps-Config, and wireless resources allocation based on the SPS performed by the base station 10 is performed for the mobile station 30.

The mobile station 30 performs setting of a transmission timing and wireless resources in accordance with the allocation request (S6), and returns a response message (RRC Connection Reconfiguration Complete) (S7).

In this way, the relay station 20 may allocate the wireless resources for initial transmission determined by the base station 10 to the mobile station 30.

<Configuration of Base Station Apparatus>

Figure 8:
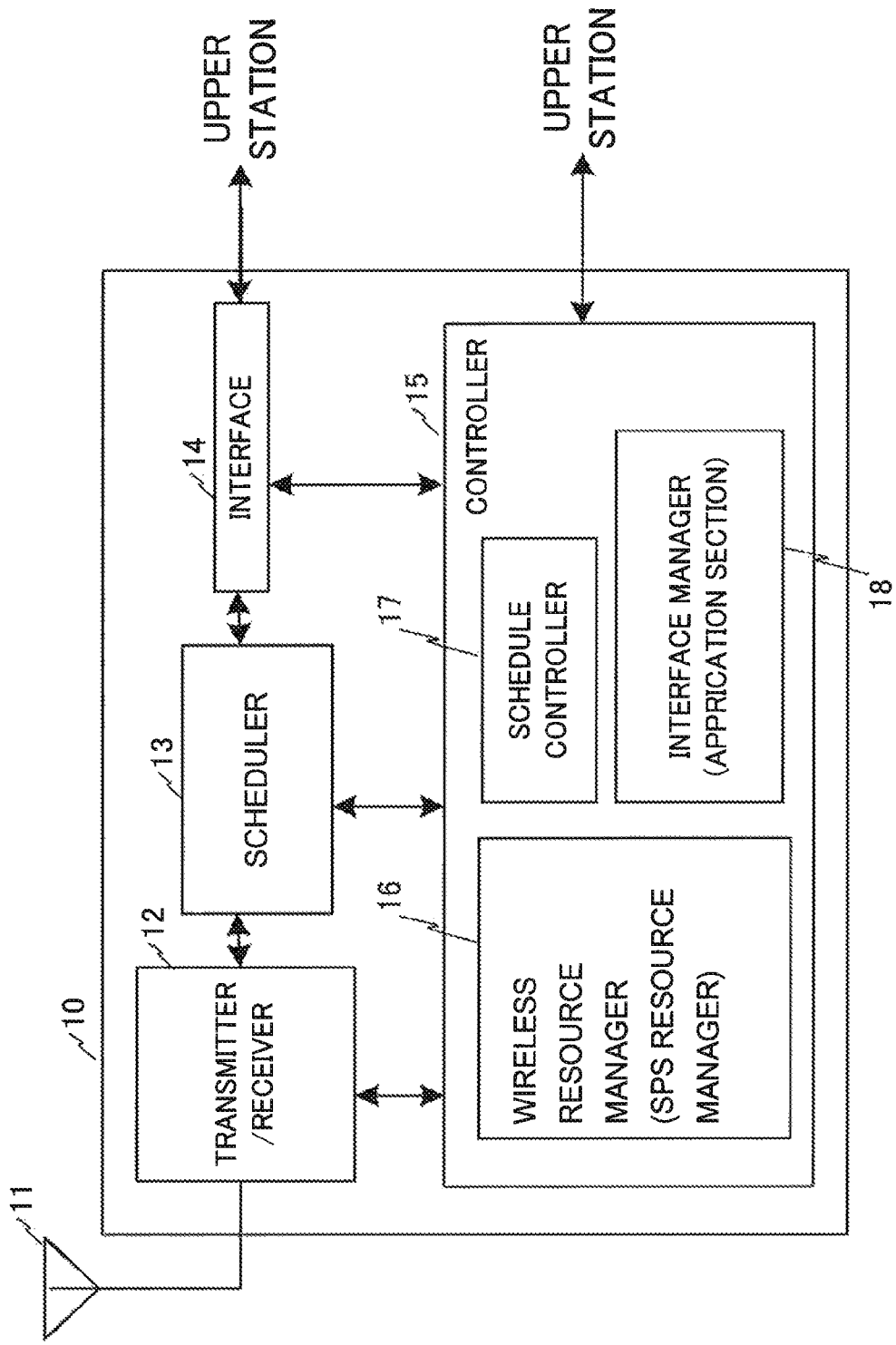
FIG. 8 illustrates a configuration example of a base station apparatus.

Next, a configuration example of a base station apparatus 10A which functions as the base station 10 illustrated in FIG. 1 will be described. FIG. 8 is a diagram illustrating the configuration example of the base station apparatus 10A. In FIG. 8, the base station apparatus 10A is provided with a transmission/reception antenna 11, a transmission/reception unit (transmitter/receiver) 12 connected with the transmission/reception antenna 11, a scheduler section (scheduler) 13 (a first scheduler) connected with the transmission/reception unit 13, an interface unit (interface) 14 with an upper station, and a control unit (controller) 15 connected with the transmission/reception unit 12, the scheduler section 13 and the interface unit 14.

The control unit 15 is provided with functions such as a wireless resource manager (SPS resource manager) 16 (a first manager), a scheduler control unit (scheduler controller) 17, an interface manager (application: AP) 18 and the like. The control unit 15 may be realized by a processor, and the control unit 15 may be adapted to execute a control operation by operating in accordance with a program.

The interface unit 14 is in charge of the top protocol layer and performs transmission/reception of data. The scheduler section 13 accumulates received data into a buffer (which is provided for the scheduler section 13) once and executes scheduling of the data in accordance with an instruction of the control unit 15. The transmission/reception unit 12 performs wireless transmission/reception of data.

The control unit 15 executes various controls related to wireless communication. The scheduler control unit 17 determines a scheduling algorithm and controls the order of data transmission. Therefore, the schedule control unit 17 controls the scheduler section 13, and, when a data error (failure in decoding) occurs, executes retransmission of data.

The interface manager (application section) 18 is the top protocol layer implemented on the base station apparatus 10A, and it manages exchange of control information with other stations. The management is executed by exchanging AP messages.

The wireless resource manager (SPS resource manager) 16 performs management and control of wireless resources. That is, the wireless resource manager 16 performs management and control of wireless resources related to the SPS.

Figure 9:
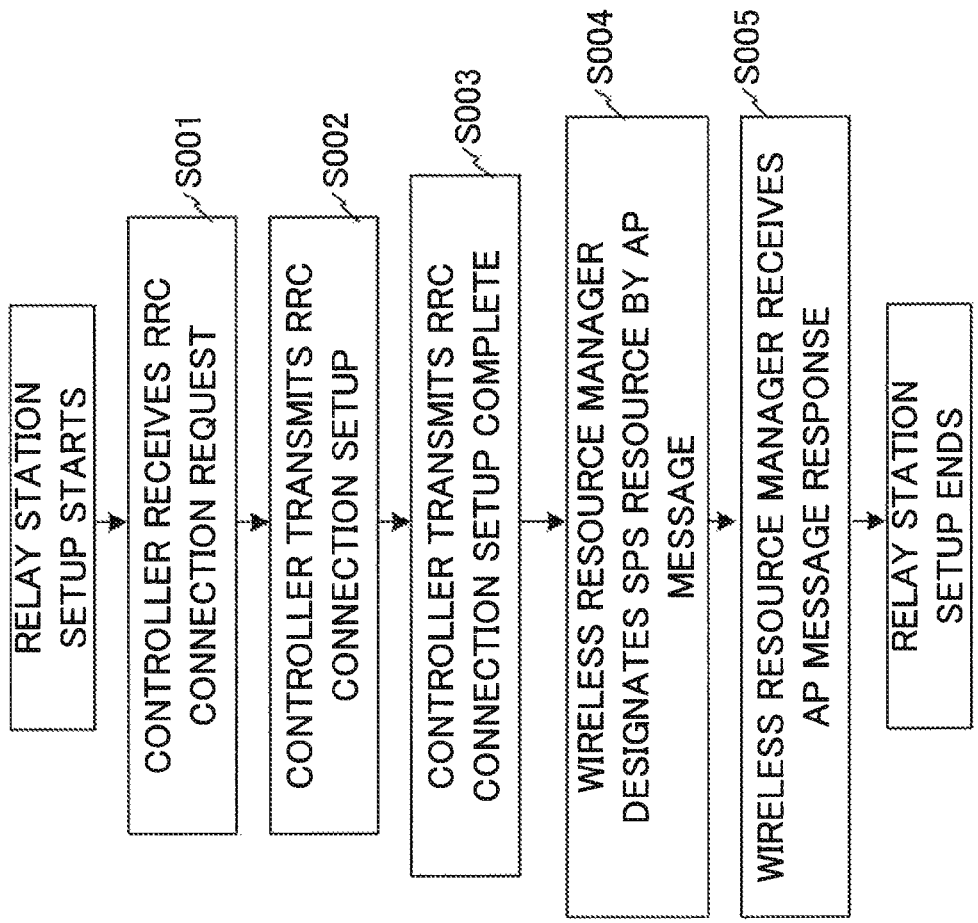
FIG. 9 is a flowchart illustrating an operation example of the base station apparatus at the time of setup of the relay station described in FIG. 5.

FIG. 9 is a flowchart illustrating an operation example of the base station apparatus 10A at the time of setup of the relay station described in FIG. 5. When setup of the relay station 20 is started, the control unit 15 of the base station apparatus 10A receives RRC Connection Request from the relay station 20 first (step S001). Next, the control unit 15 transmits RRC Connection Setup to the relay station 20 (step S002). Next, the control unit 15 receives RRC Connection Setup Complete (step S003). Next, the wireless resource manager 16 specifies SPS resources by an AP message and notifies the relay stations 20 thereof (step S004). After that, the wireless resource manager 16 receives an AP message response from the relay station 20 (step S005) and ends the process.

Figure 10:
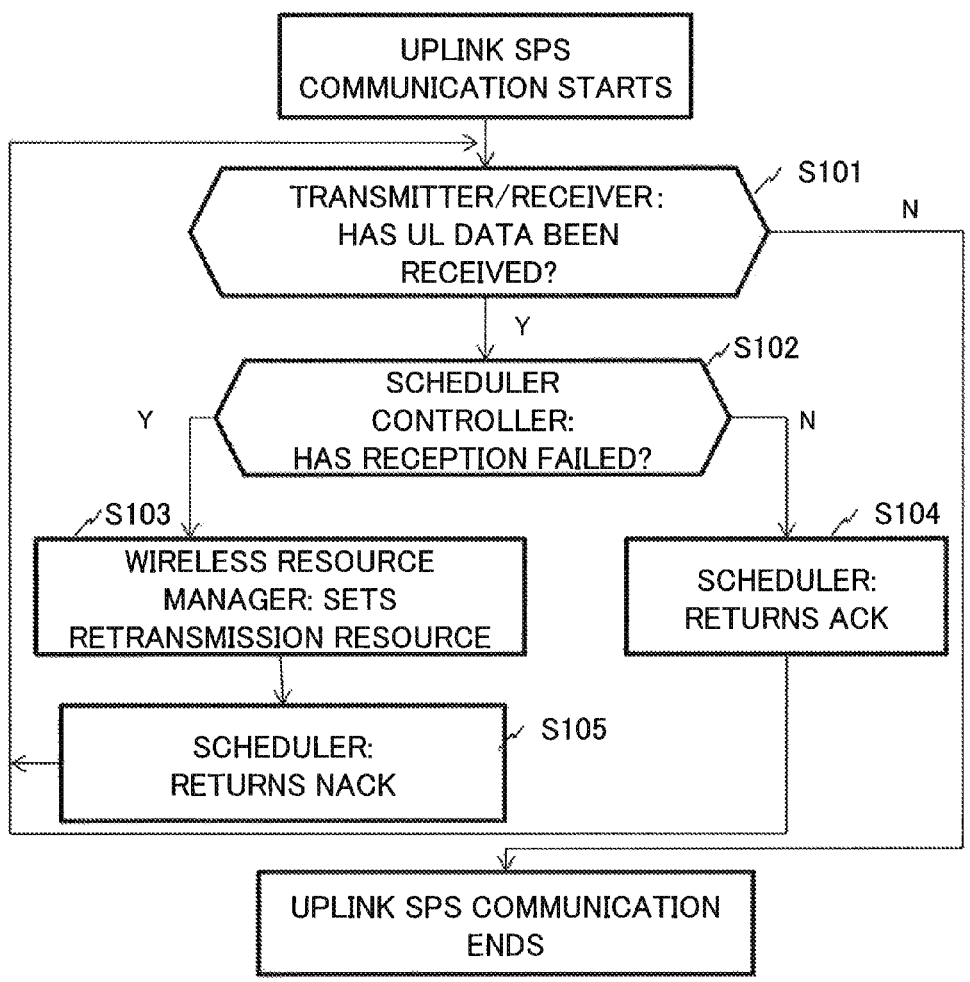
FIG. 10 is a flowchart illustrating an operation example (an uplink SPS communication process) of the base station apparatus at the time of uplink SPS communication described in FIG. 3.

FIG. 10 is a flowchart illustrating an operation example (an uplink SPS communication process) of the base station apparatus 10A at the time of uplink SPS communication described in FIG. 3. In FIG. 10, when the process is started, the transmission/reception section judges whether uplink data has been received (uplink communication data) or not (step S101). When uplink data has not been received, the process ends. In comparison, when uplink data has been received, the schedule control unit 17 judges whether the reception of the uplink data has failed or not (step S102). When the reception of the uplink data has been failed, the wireless resource manager 16 sets wireless resources for retransmission (step S103), and the scheduler section 13 returns NACK (step S105). In comparison, when the reception of the uplink data has not failed (successful), the scheduler section 13 returns ACK (step S104). After steps S104 and S105 end, the uplink SPS communication process ends.

Figure 11:
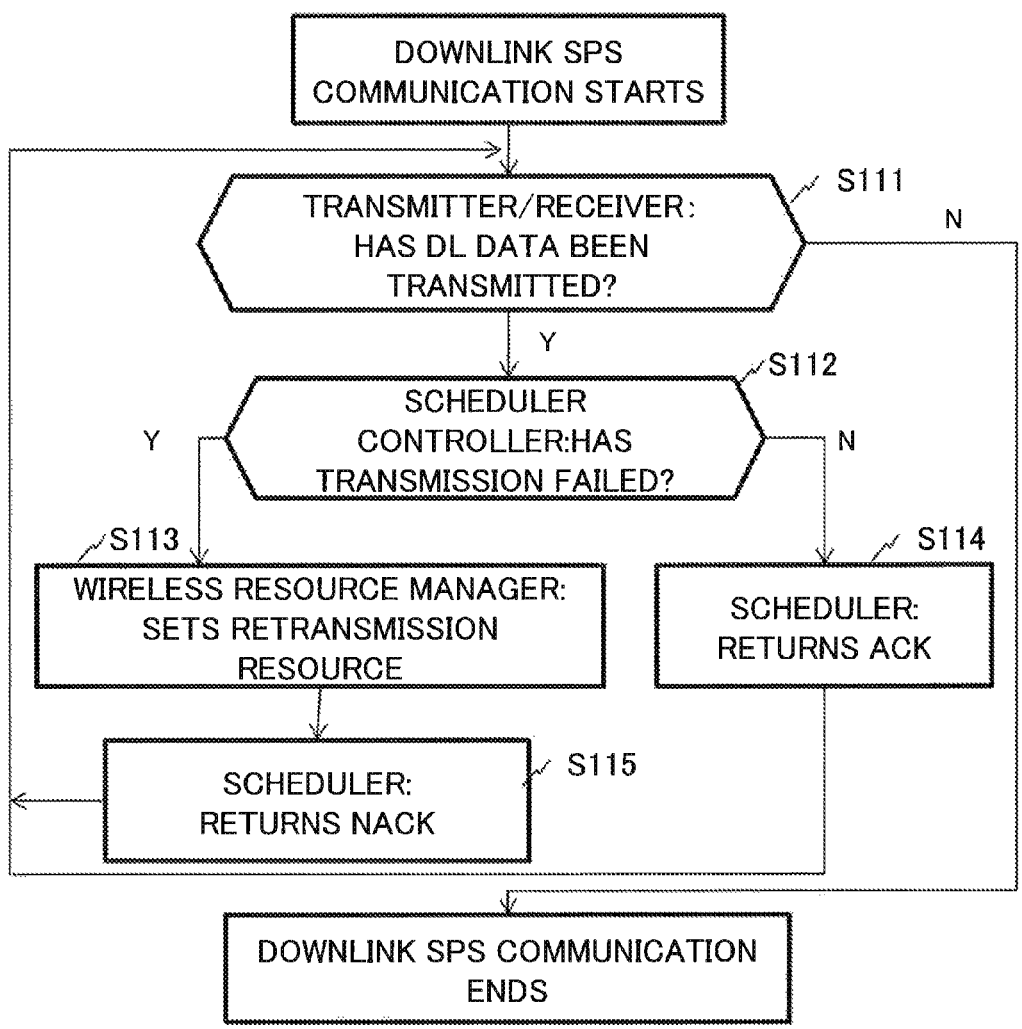
FIG. 11 is a flowchart illustrating an operation example (a downlink SPS communication process) of the base station apparatus at the time of downlink SPS communication described in FIG. 4.

FIG. 11 is a flowchart illustrating an operation example (a downlink SPS communication process) of the base station apparatus 10A at the time of downlink SPS communication described in FIG. 4. In FIG. 11, when the process is started, the transmission/reception section judges whether downlink data (downlink communication data) has been received or not (step S111). When downlink data has not been received, the process ends. In comparison, when downlink data has been received, the schedule control unit 17 judges whether the reception of the downlink data has failed or not (step S112). When the reception of the downlink data has failed, the wireless resource manager 16 sets wireless resources for retransmission (step S113), and the scheduler section 13 returns NACK (step S115). In comparison, when the reception of the downlink data has not failed (successful), the scheduler section 13 returns ACK (step S104). After steps S114 and S115 end, the downlink SPS communication process ends.

<Configuration of Relay Station Apparatus>

Figure 12:
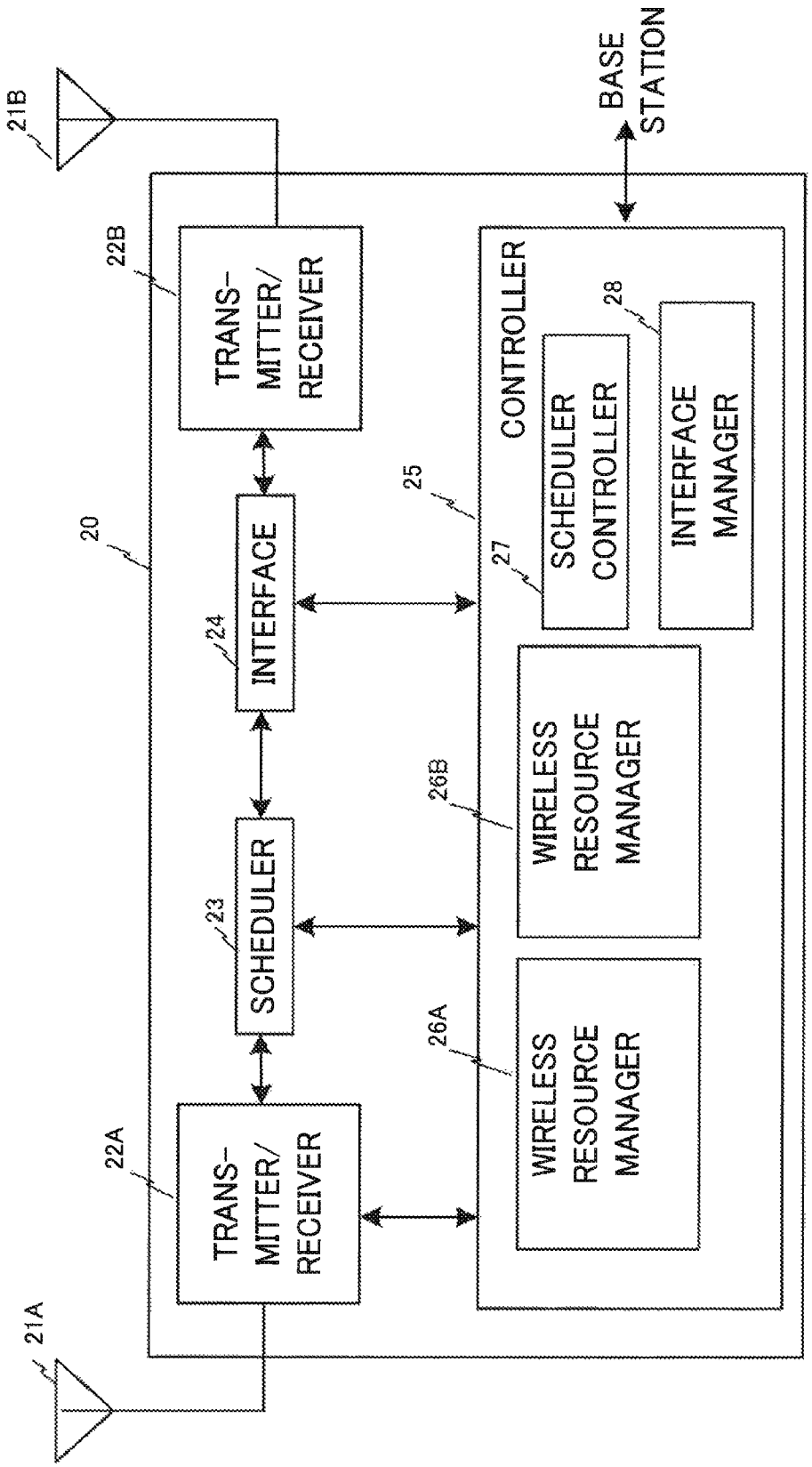
FIG. 12 is a diagram illustrating a configuration example of a relay station apparatus.

Next, a configuration example of a relay station apparatus 20A which functions as the relay station 20 illustrated in FIG. 1 will be described. FIG. 12 is a diagram illustrating the configuration example of the relay station apparatus 20A. In FIG. 12, the relay station apparatus 20A is provided with a user-side (terminal-side) transmission/reception antenna 21A, a network-side (base-station-side) transmission/reception antenna 21B, a transmitter/receiver 22A connected with the transmission/reception antenna 21A, and a transmitter/receiver 22B connected with the transmission/reception antenna 21B. The relay station apparatus 20A is also provided with a scheduler 23 (second scheduler) connected with the transmitter/receiver 22A, an interface (interface circuit) 24, and a control unit (controller) 25 connected with the transmitter/receiver 22A, the scheduler section 23 and the interface section 24.

The control unit 25 is provided with a wireless resource manager (SPS initial transmission manager) 26A, a wireless resource manager (SPS retransmission manager) 26B (second manager), a schedule control unit 27 and an interface manager (application section: AP) 28.

The wireless resource manager (SPS initial transmission manager) 26A performs management and control of wireless resources. Especially in the case of the SPS, it performs management and control of wireless resources for initial transmission. The wireless resource manager (SPS retransmission manager) 26B performs management and control of wireless resources. Especially in the case of the SPS, it performs management and control of wireless resources for retransmission. Each of the blocks except the wireless resource control units 26A and 26B have functions almost similar to those of the blocks having the same names in the base station apparatus 10A.

Figure 13:
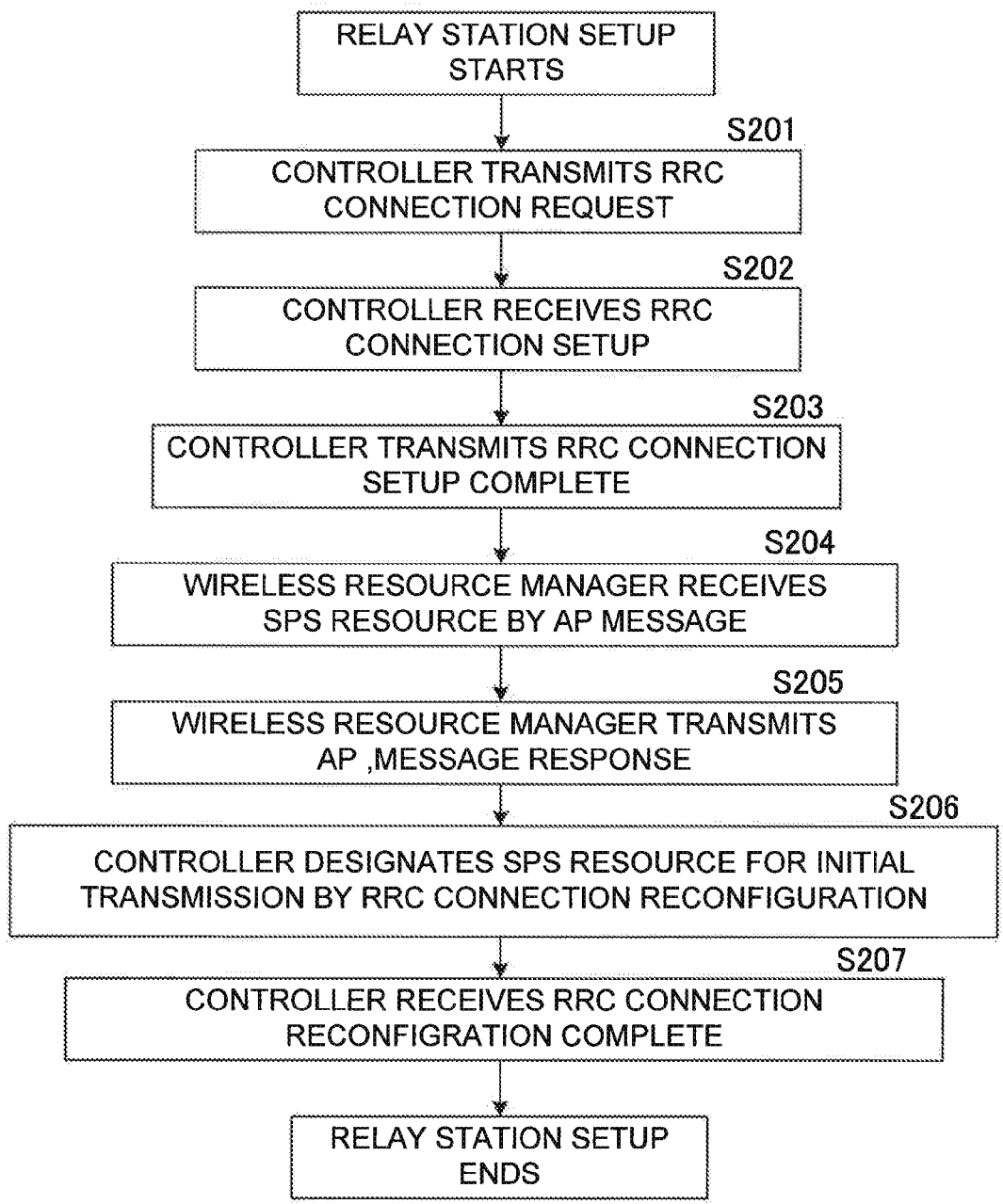
FIG. 13 is a flowchart illustrating an operation example (a setup process) at the time of setup of the relay station apparatus.

FIG. 13 is a flowchart illustrating an operation example (a setup process) of the relay station apparatus 20A at the time of setup of the relay station 20. In FIG. 13, when the process is started, the control unit 25 transmits RRC Connection Request to the base station 10 (step S201).

Next, the control unit 25 receives RRC Connection Setup from the base station 10 (step S202). Next, the control unit 25 transmits RRC Connection Setup Complete to the base station 10 (step S203). Next, the wireless resource manager 26A receives specification of SPS resources from the base station 10 by an AP message (step S204).

Next, the wireless resource manager 26A transmits an AP message response to the base station 10 (step S205). Next, the control unit 15 specifies SPS resources for initial transmission to the mobile station 30 by RRC Connection Reconfiguration (step S206). After that, the control unit 15 receives Connection Reconfiguration Complete from the mobile station 30 (step S207) and ends the relay station setup process.

Figure 14:
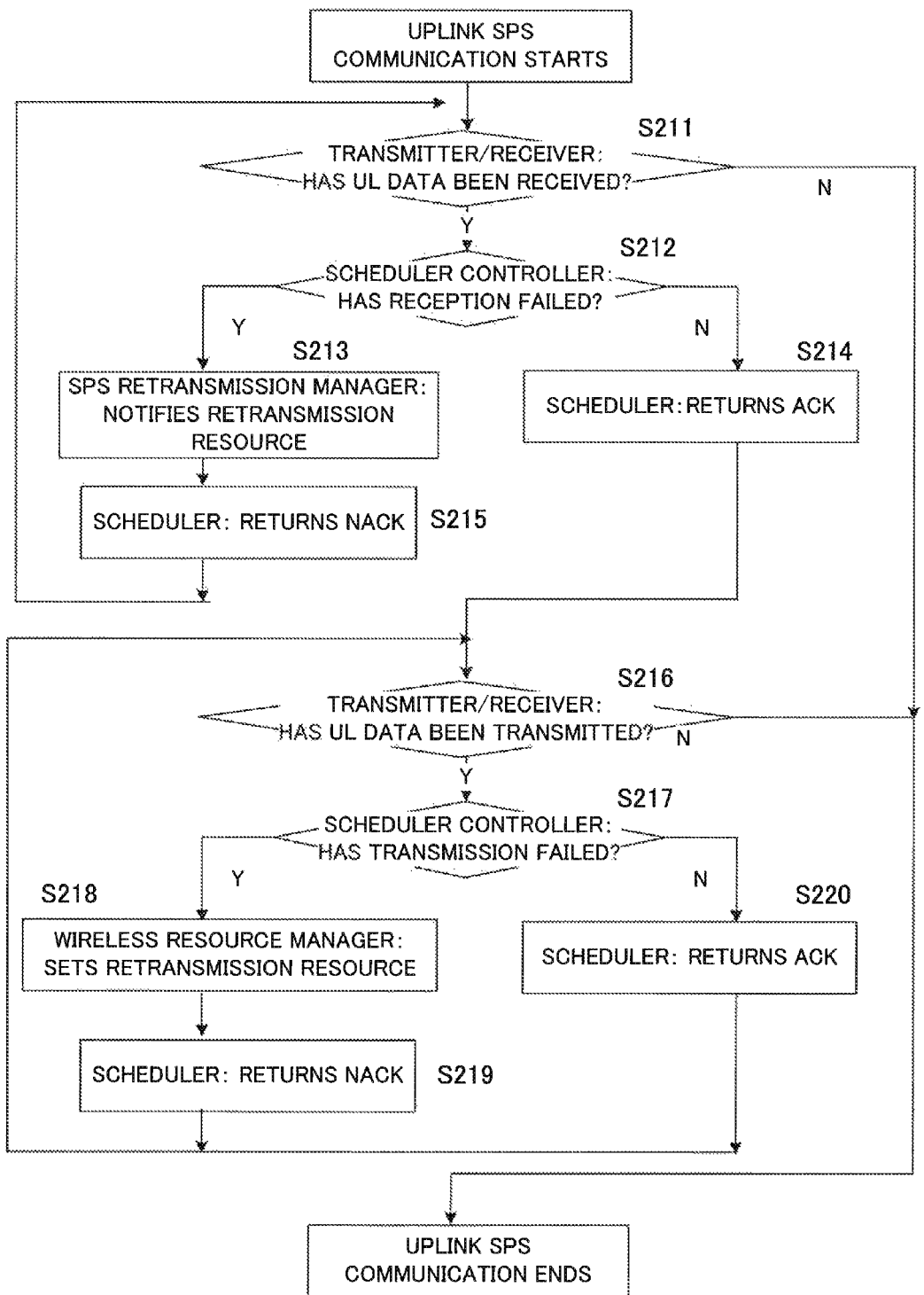
FIG. 14 is a flowchart illustrating an operation example (an uplink communication process) of the relay station apparatus at the time of uplink SPS communication.

FIG. 14 is a flowchart illustrating an operation example (an uplink communication process) of the relay station 20 at the time of uplink SPS communication. When the process illustrated in FIG. 14 is started, the transmission/reception section 21A judges whether uplink data has been received or not (step S211). When uplink data has not been received, the process ends.

When uplink data has been received, the schedule control unit 27 judges whether the reception of the uplink data has failed or not (step S212). When the reception of the uplink data has failed, the SPS retransmission manager 26B notifies wireless resources for data retransmission (step S213), and the scheduler section 23 returns NACK to the mobile station 30 (step S214). After that, the process returns to step S211.

In comparison, when the reception of the uplink data has not failed, that is, the reception has succeeded, the scheduler section 23 returns ACK to the mobile station 30 (step S215).

After that, the transmission/reception section 22B judges whether the uplink data has been transmitted or not (step S216). When uplink data has not been transmitted, the process ends. In comparison, when uplink data has been transmitted, the scheduler control unit 27 judges whether the transmission has failed or not (step S217).

When the transmission has failed, the wireless resource manager (SPS retransmission manager) 26B sets wireless resources for retransmission for the mobile station 30 (step S218), and the scheduler control unit 27 returns NACK (step S219). In comparison, when the transmission has not failed, that is, the transmission has succeeded, the scheduler section 27 returns ACK. After steps S219 and S220 end, the uplink SPS communication process ends.

Figure 15:
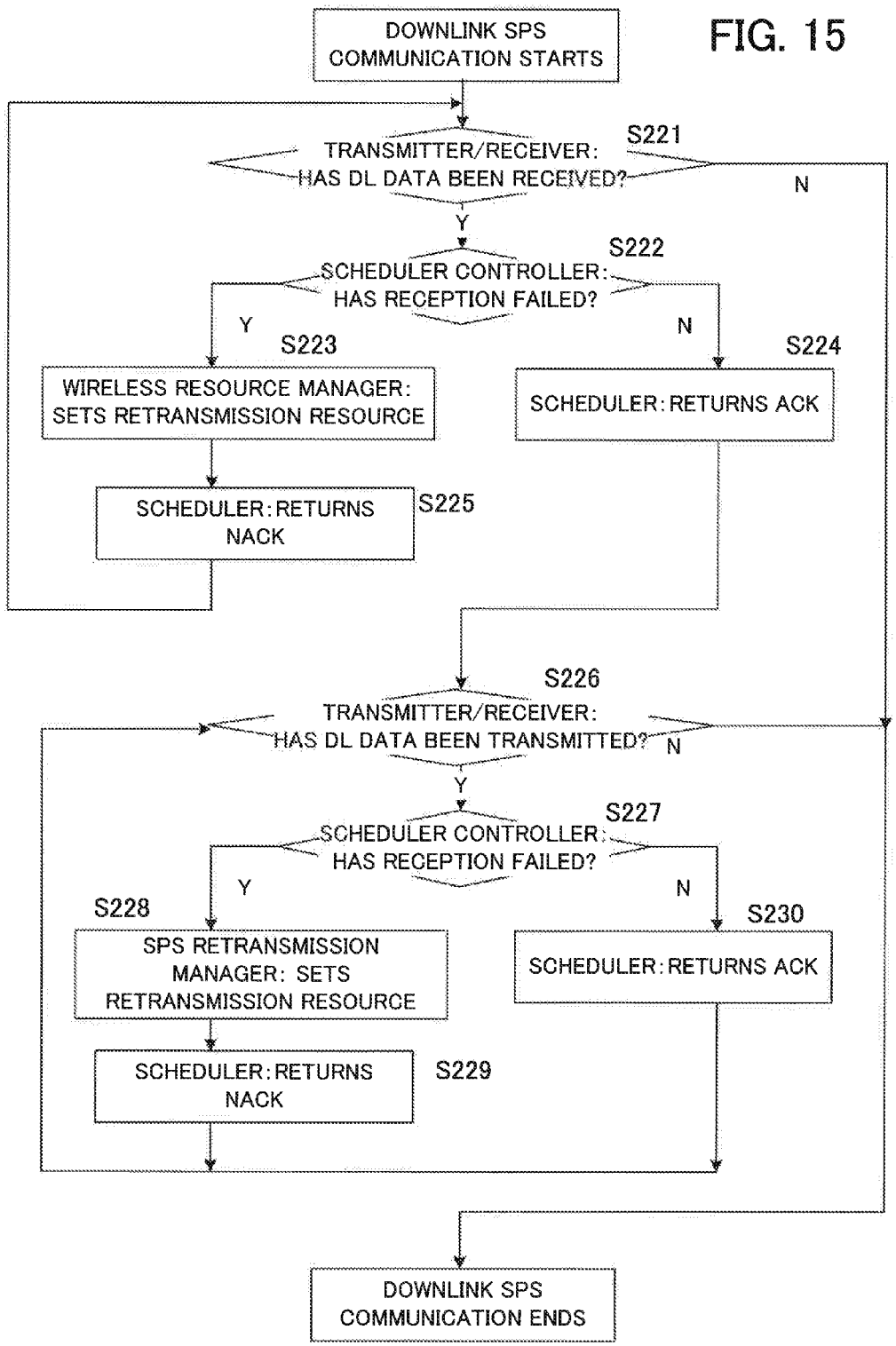
FIG. 15 is a flowchart illustrating an operation example (a downlink communication process) of the relay station apparatus at the time of downlink SPS communication.

FIG. 15 is a flowchart illustrating an operation example (a downlink communication process) of the relay station 20 at the time of downlink SPS communication. When the process illustrated in FIG. 15 is started, the transmission/reception section 21B judges whether downlink data has been received or not (step S221). When downlink data has not been received, the process ends.

When downlink data has been received, the scheduler control unit 27 judges whether the reception of the downlink data has failed or not (step S222). When the reception of the downlink data has failed, the wireless resource manager (SPS retransmission manager) 26B sets wireless resources for data retransmission (step S213), and the scheduler section 23 returns NACK to the base station 10 (step S224). After that, the process returns to step S221.

In comparison, when the reception of the downlink data has not failed, that is, the reception has succeeded, the scheduler section 23 returns ACK to the base station 10 (step S225). After that, the transmission/reception section 22A judges whether the downlink data has been transmitted or not (step S226). When downlink data has not been transmitted, the process ends. In comparison, when downlink data has been transmitted, the scheduler control unit 27 judges whether the transmission has failed or not (step S227).

When the transmission has failed, the wireless resource manager (SPS retransmission manager) 26B sets wireless resources for retransmission for the base station 10 (step S228), and the scheduler control unit 27 returns NACK (step S229). In comparison, when the transmission has not failed, that is, the transmission has succeeded, the scheduler section 27 returns ACK to the base station 10. After steps S229 and S230 end, the downlink SPS communication process ends.

<Configuration of Mobile Station Apparatus>

Figure 16:
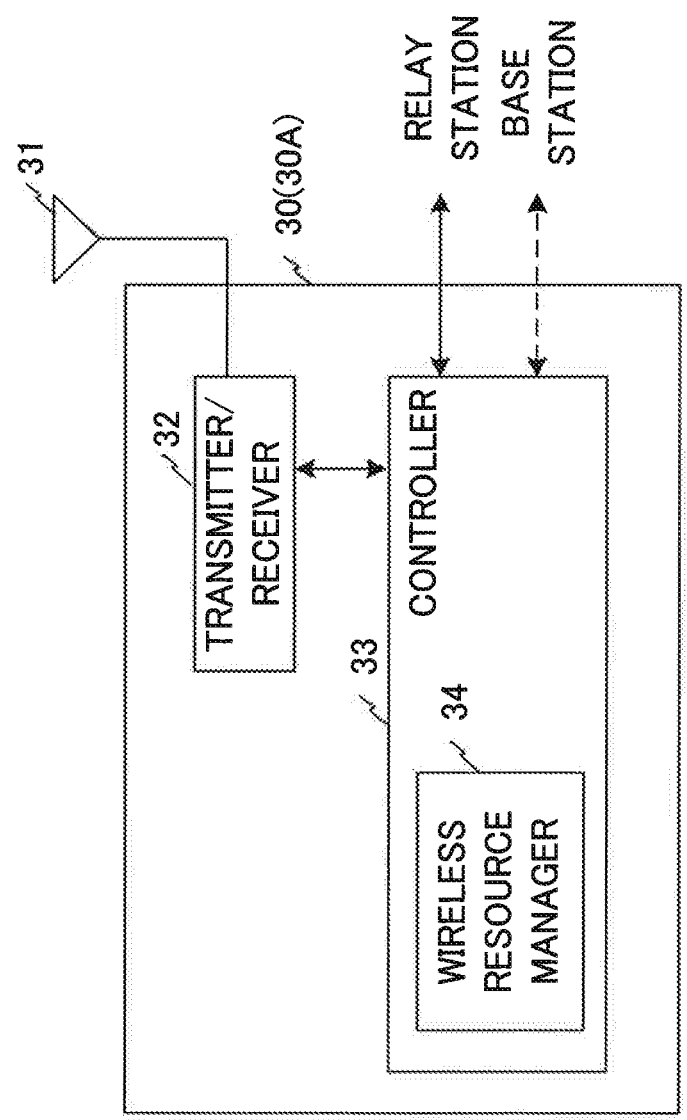
FIG. 16 is a diagram illustrating a configuration example of a mobile station apparatus.

Next, a configuration example of a mobile station apparatus 30A which functions as the mobile station 30 illustrated in FIG. 1 will be described. FIG. 16 is a diagram illustrating the configuration example of the mobile station apparatus 30A. In FIG. 16, the mobile station apparatus 30A is provided with a transmission/reception antenna 31, a transmission/reception section 32 connected with the transmission/reception antenna 31, and a control unit (controller) 33 connected with the transmission/reception section 32. The control unit 33 is provided with a wireless resource manager (SPS resource manager) 34.

The transmission/reception section 32 performs wireless transmission/reception of data. The control unit 33 executes various controls related to wireless communication. There are a case of being controlled directly by the relay station 20 as illustrated by the solid arrow in FIG. 16, and a case of being controlled indirectly by the base station 10 as illustrated by a broken-line arrow. However, which of the base station 10 and the relay station 20 controls is not noticed.

The wireless resource manager (SPS resource manager) performs management control of wireless resources. Especially in the case where SPS scheduling of wireless resources is performed, management control of wireless resources for retransmission is performed.

Figure 17:
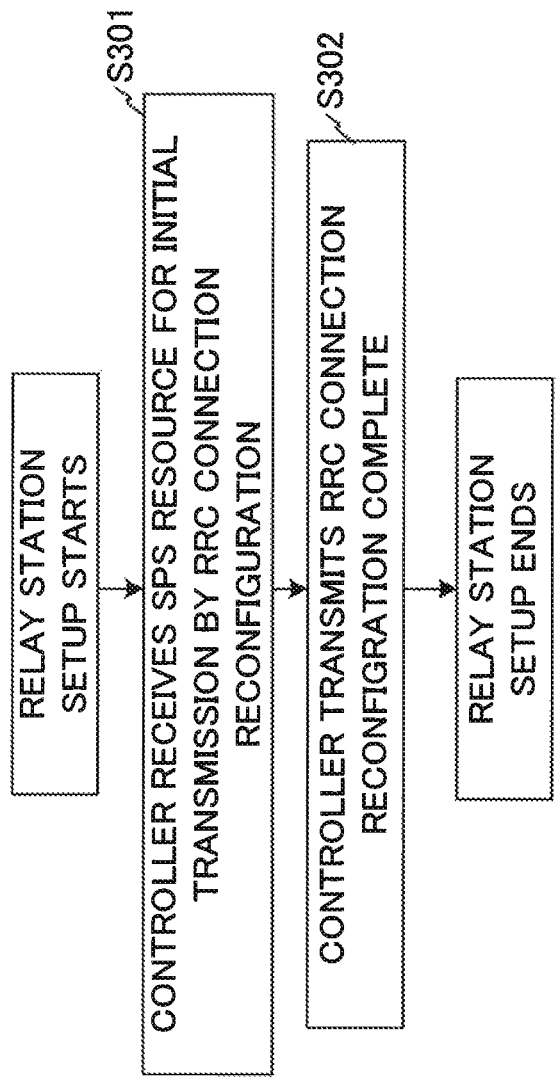
FIG. 17 is a flowchart illustrating an operation example (a setup process) of the mobile station apparatus at the time of setup of the relay station.

FIG. 17 is a flowchart illustrating an operation example (a setup process) of the mobile station apparatus 30A at the time of setup of the relay station 20. When the process illustrated in FIG. 17 is started, the control unit 33 receives SPS resources for initial transmission by RRC Connection Reconfiguration (step S301). When the SPS resources for initial transmission are secured in accordance with RRC Connection Reconfiguration, the control unit 33 transmits RRC Connection Reconfiguration Complete (step S302) and ends the process.

Figure 18:
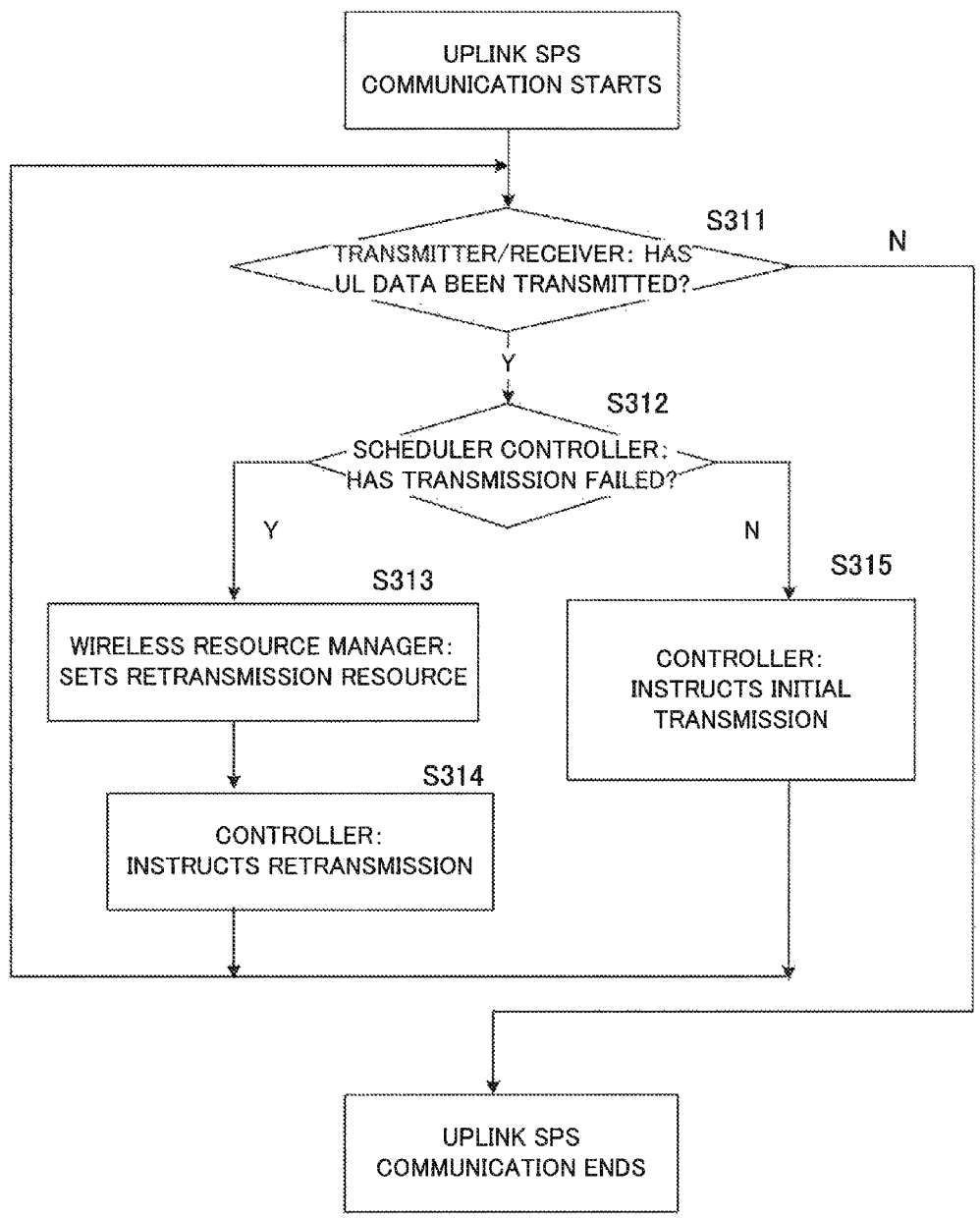
FIG. 18 is a flowchart illustrating an operation example (an uplink SPS communication process) of the mobile station apparatus at the time of uplink SPS communication.

FIG. 18 is a flowchart illustrating an operation example (an uplink SPS communication process) of the relay station apparatus 30A at the time of uplink SPS communication. When the process illustrated in FIG. 18 is started, the transmission/reception section 32 judges whether uplink data has been transmitted or not (step S311). When uplink data has not been transmitted, the process ends.

When uplink data has been transmitted, the control unit 33 judges whether the transmission has failed or not (step S312). When the transmission has failed, the wireless resource manager 34 performs setting of retransmission resources (step S313). After that, the control unit 33 issues a retransmission instruction, and the transmission/reception section 32 retransmits the uplink data. In comparison, when the transmission has not failed, that is, the transmission has succeeded, the control unit 33 instructs initial transmission of the next uplink data (step S315), and the transmission/reception section 32 transmits the next uplink data. When steps S314 and S315 end, the uplink SPS communication process ends.

Figure 19:
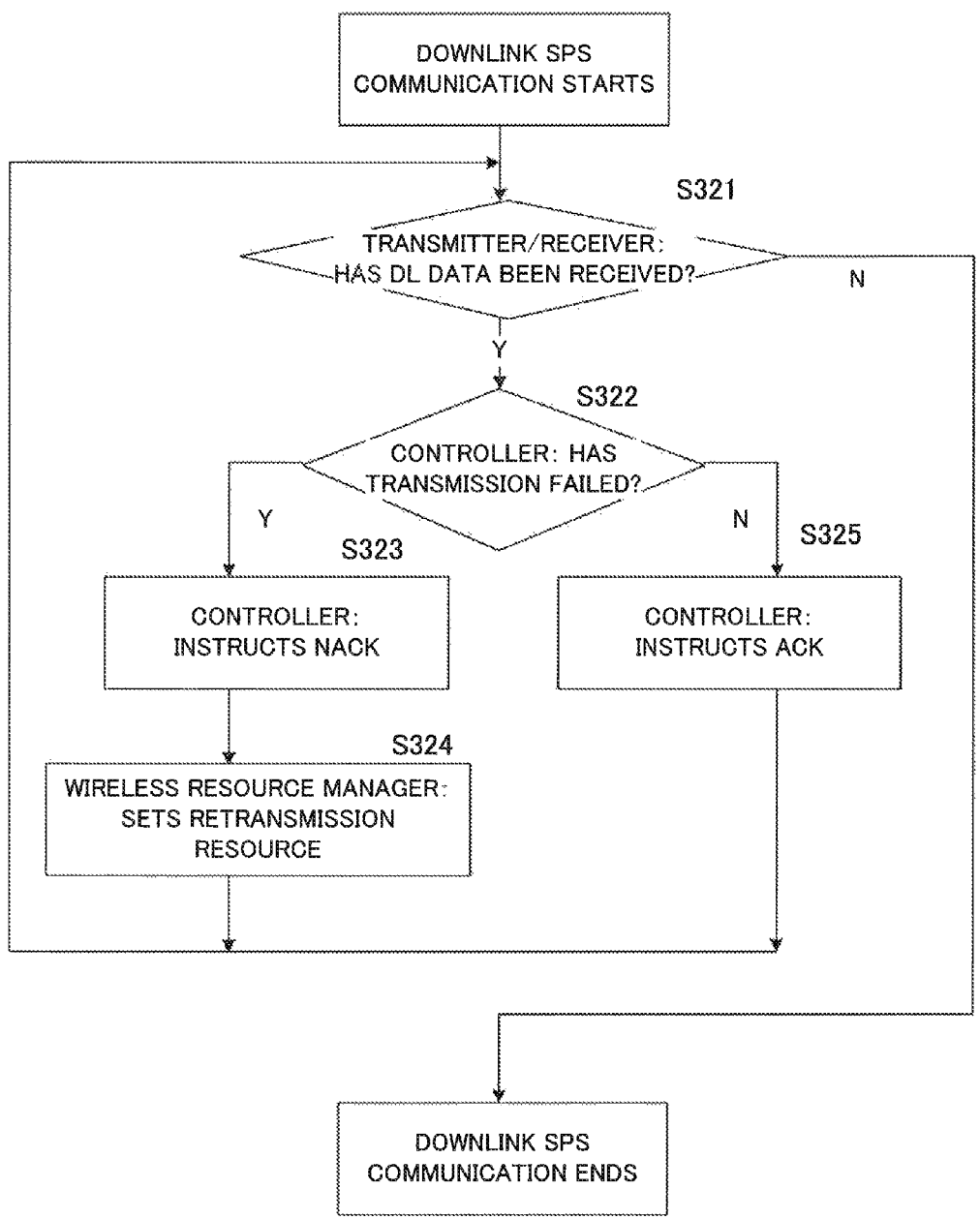
FIG. 19 is a flowchart illustrating an operation example (a downlink SPS communication process) of the mobile station apparatus at the time of downlink SPS communication.
Figure 20:
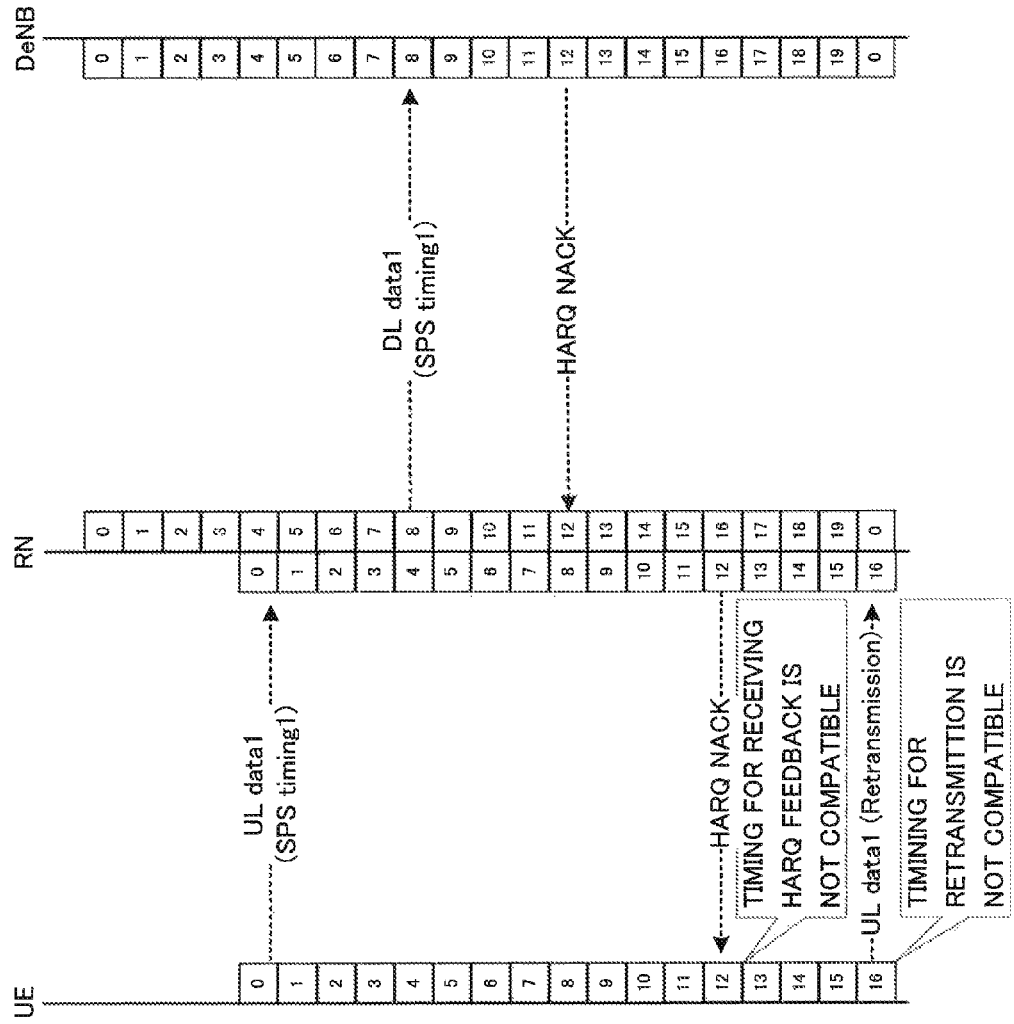
FIG. 20 illustrates an example of uplink SPS communication when the relay station intervenes.
Figure 21:
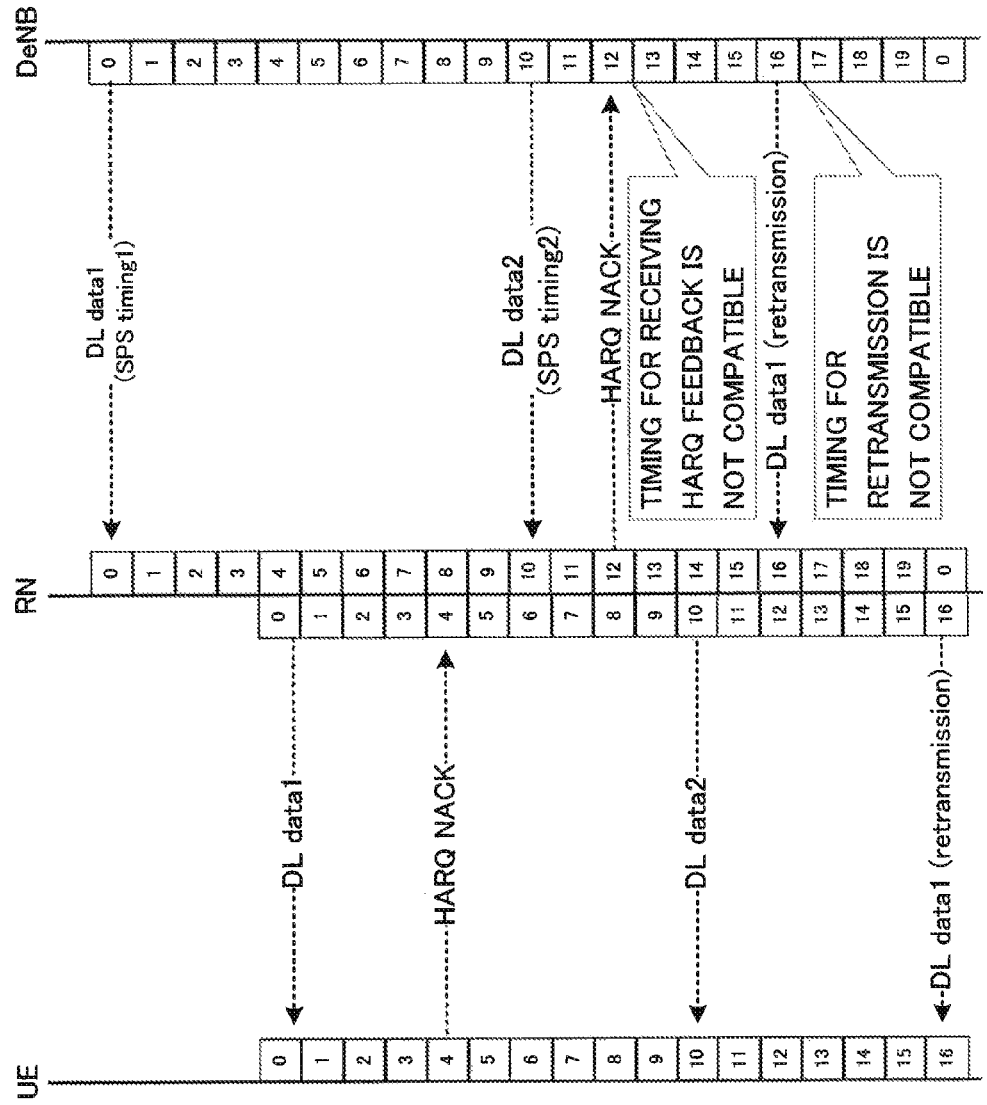
FIG. 21 illustrates an example of downlink SPS communication when the relay station intervenes.

FIG. 19 is a flowchart illustrating an operation example (a downlink SPS communication process) of the mobile station apparatus 30A at the time of downlink SPS communication. When the process illustrated in FIG. 19 is started, the transmission/reception section 32 judges whether downlink data has been received or not (step S321). When downlink data has not been received, the process ends.

When downlink data has been received, the control unit 33 judges whether the reception of the downlink data has failed or not (step S322). When the reception has failed, the control unit 33 instructs transmission of NACK (step S323), and the transmission/reception section 32 transmits NACK. After that, the wireless resource manager 34 performs setting of wireless resources for receiving the retransmitted data.

In comparison, when the reception has not failed, that is, the reception has succeeded, the control unit 33 instructs transmission of ACK (step S325), and the transmission/reception section 32 transmits ACK. When processing of step S324 or S325 ends, the downlink SPS communication process ends.

Each of the blocks of the base station apparatus 10A, the relay station apparatus 20A and the mobile station apparatus 30A described above may be realized by dedicated or general-purpose hardware. Alternatively, a part or all of functions realized by each block may be realized by a processor, such as a CPU and a DSP, executing a program stored in a storage device such as a memory.

According to the embodiment, it is possible to execute an appropriate retransmission procedure even when a relay station intervenes in communication between a mobile station and a base station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile communication system, comprising:
a base station; and
a relay station to relay data transmitted/received between the base station and a mobile station,
the base station including:
a first scheduler configured to perform scheduling of initial transmission of the data transmitted/received between the base station and the mobile station via the relay station; and
a first manager configured to manage predetermined wireless resources which are periodically used, as wireless resources used for the initial transmission of the data; and
the relay station including:
a second scheduler configured to perform scheduling of transmission of a message for confirming necessity of retransmission of the data and retransmission of the data; and
a second manager configured to manage wireless resources used for the transmission of the message and the retransmission of the data.

2. The mobile communication system according to claim 1, wherein the relay station inhibits a message indicating success of reception of the retransmitted data, which is received from the mobile station, from being relayed to the base station.

3. The mobile communication system according to claim 1, wherein, when receiving a message indicating success of reception by the relay station in response to the data initially transmitted to the relay station, the base station regards transmission of the data to the mobile station as having succeeded, irrespective of whether retransmission of the data has occurred between the relay station and the mobile station.

4. The mobile communication system according to claim 1, wherein the predetermined wireless resources which are periodically used are wireless resources used in accordance with Semi-persistent Scheduling in Long Term Evolution.

5. A mobile station for transmitting and receiving data to and from a base station via a relay station, the mobile station comprising:
a transmitter/receiver configured to transmit and receive data initially transmitted in accordance with scheduling of initial transmission of the data using predetermined wireless resources which are managed by the base station and periodically used; and
a controller configured to perform control for, in accordance with scheduling of transmission of a message for confirming necessity of retransmission of the data and the retransmission of the data with the use of wireless resources managed by the relay station, transmitting and receiving the message and the retransmitted data.

6. A relay station to relay data transmitted/received between a base station and a mobile station, the relay station comprising:

a transmitter/receiver configured to transmit/receive the data initially transmitted in accordance with scheduling of initial transmission of the data using predetermined wireless resources which are managed by the base station and periodically used; and
a controller configured to control, in accordance with scheduling of transmission of a message for judging necessity of retransmission of the data and the retransmission of the data with the use of wireless resources managed by the relay station, the transmission of the message and the retransmission of the data,
wherein the controller inhibits the message received from one of the base station and the mobile station from being relayed to the other.

7. A schedule method in a mobile communication system comprising a base station and a relay station relaying data transmitted/received between the base station and a mobile station, the method comprising:
the base station performing scheduling of initial transmission of the data using predetermined wireless resources which are managed by the base station and periodically used; and
the relay station performing scheduling of transmission of a message confirming necessity of retransmission of the data and the retransmission of the data with the use of wireless resources managed by the relay station.

8. The scheduling method of the mobile communication system according to claim 7, wherein the relay station inhibits a message indicating success of reception of the retransmitted data, which is received from the mobile station, from being relayed to the base station.

9. The scheduling method of the mobile communication system according to claim 7, wherein, when receiving a message indicating success of reception by the relay station in response to the data initially transmitted to the relay station, the base station regards transmission of the data to the mobile station as having succeeded, irrespective of whether retransmission of the data has occurred between the relay station and the mobile station.

10. The scheduling method of the mobile communication system according to claim 7, wherein the predetermined wireless resources which are periodically used are wireless resources used in accordance with Semi-persistent Scheduling in Long Term Evolution.

11. A data transmission/reception method of a mobile station for transmitting and receiving data to and from a base station via a relay station, the method comprising:
transmitting and receiving data initially transmitted in accordance with scheduling of initial transmission of the data using predetermined wireless resources which are managed by the base station and periodically used; and
in accordance with scheduling of transmission of a message for confirming necessity of retransmission of the data and the retransmission of the data with the use of wireless resources managed by the relay station, transmitting and receiving the message and the retransmitted data.

12. A data transmission/reception method of a relay station relaying data transmitted/received between a base station and a mobile station, the method comprising:
transmitting/receiving data initially transmitted in accordance with scheduling of initial transmission of the data using predetermined wireless resources which are managed by the base station and periodically used;
performing, in accordance with scheduling of transmission of a message for judging necessity of retransmission of the data and the retransmission of the data with the use of wireless resources managed by the relay station, the transmission of the message and the retransmission of the data; and inhibiting the message received from one of the base station and the mobile station from being relayed to the other.

* * * * *